US011217082B2

United States Patent
Sale et al.

(10) Patent No.: US 11,217,082 B2
(45) Date of Patent: Jan. 4, 2022

(54) WATER SENSOR

(71) Applicants: Delta Faucet Company, Indianapolis, IN (US); iDevices, LLC, Avon, CT (US)

(72) Inventors: Michael C. Sale, Carmel, IN (US); Joel D. Sawaski, Indianapolis, IN (US); Michael Tetreault, Simsbury, CT (US); Hillary C. Tracy, West Hartford, CT (US); Eric L. Ferguson, Simsbury, CT (US); Michael A. Daigle, Glastonbury, CT (US); Casey S. Weaver, Carmel, IN (US); Jeffrey A. Scarcella, Tariffville, CT (US)

(73) Assignees: Delta Faucet Company, Indianapolis, IN (US); iDevices, LLC, Avon, CT (US)

( * ) Notice: Subject to any disclaimer, the term of this patent is extended or adjusted under 35 U.S.C. 154(b) by 0 days.

(21) Appl. No.: 16/745,940

(22) Filed: Jan. 17, 2020

(65) Prior Publication Data

US 2020/0152046 A1 May 14, 2020

Related U.S. Application Data

(63) Continuation of application No. 16/067,477, filed as application No. PCT/IB2016/001954 on Dec. 30, 2016, now Pat. No. 10,672,252.

(Continued)

(51) Int. Cl.
G08B 21/00 (2006.01)
G08B 21/20 (2006.01)
(Continued)

(52) U.S. Cl.
CPC ......... G08B 21/20 (2013.01); G01F 23/0076 (2013.01); G08B 21/182 (2013.01); H04H 60/88 (2013.01)

(58) Field of Classification Search
CPC ... G08B 21/20; G08B 21/182; G01F 23/0076; H04H 60/88
(Continued)

(56) References Cited

U.S. PATENT DOCUMENTS 4,264,902 A 4/1981 Miller
4,297,683 A 10/1981 Roberts
(Continued)

FOREIGN PATENT DOCUMENTS

CN 101036042 A 9/2007
CN 101292273 A 10/2008
(Continued)

OTHER PUBLICATIONS

Water Leak Alarm, http://www.alibaba.com/product-gs/577928867/Wired_water_leak_detection_system/with.html, pp. 2-3, Sep. 9, 2013.
(Continued)

Primary Examiner — Zhen Y Wu
(74) Attorney, Agent, or Firm — Bose McKinney & Evans LLP

(57) ABSTRACT

A water sensor comprises a housing including a top portion and a bottom portion; a controller positioned within the housing; a power source electrically coupled to the controller to energize the controller; and a continuity sensor electrically coupled to the controller and including an inner arcuate portion and an outer arcuate portion, the inner arcuate portion having an electrically conductive surface spanning at least 300 degrees, the outer arcuate portion having an electrically conductive surface spanning at least 300 degrees and substantially surrounding the inner arcuate (Continued)

portion to define an elongate gap therebetween, wherein the water sensor is structured to transition from a first logical state to a second logical state responsive to water bridging the elongate gap, and wherein the controller is structured to transmit a wireless water detection signal responsive to the water sensor transitioning to the second logical state.

11 Claims, 28 Drawing Sheets

Related U.S. Application Data

(60) Provisional application No. 62/273,736, filed on Dec. 31, 2015.

(51) Int. Cl.
*H04H 60/88* (2008.01)
*G01F 23/00* (2006.01)
*G08B 21/18* (2006.01)

(58) Field of Classification Search
USPC .......................................................... 340/618
See application file for complete search history.

(56) References Cited

U.S. PATENT DOCUMENTS

| | | | |
|---|---|---|---|
| 4,305,420 A | 12/1981 | Nussdorf | |
| 4,338,546 A * | 7/1982 | Ehret | G01F 23/243 315/119 |
| 4,598,273 A | 7/1986 | Bryan, Jr. et al. | |
| 4,635,477 A | 1/1987 | Simon | |
| 4,673,926 A | 6/1987 | Gorman | |
| 4,749,988 A | 6/1988 | Berman et al. | |
| 4,845,472 A * | 7/1989 | Gordon | D06F 33/47 340/605 |
| 4,922,232 A | 5/1990 | Bosich | |
| 5,058,421 A | 10/1991 | Alexander et al. | |
| 5,091,715 A * | 2/1992 | Murphy | G01F 23/242 200/61.05 |
| 5,156,047 A | 10/1992 | Tuma et al. | |
| 5,196,729 A | 3/1993 | Thorngren | |
| 5,229,750 A | 7/1993 | Welch, Jr. et al. | |
| 5,283,569 A | 2/1994 | Nelson | |
| 5,347,849 A | 9/1994 | Reeme et al. | |
| 5,357,241 A | 10/1994 | Welch, Jr. et al. | |
| 5,357,247 A | 10/1994 | Marnel et al. | |
| 5,576,486 A | 11/1996 | Paz | |
| 5,595,342 A * | 1/1997 | McNair | G05D 23/1905 236/51 |
| 5,655,561 A * | 8/1997 | Wendel | G01F 23/243 137/79 |
| 5,870,632 A | 2/1999 | Ho | |
| 5,971,597 A | 10/1999 | Baldwin et al. | |
| 5,992,218 A | 11/1999 | Tryba et al. | |
| 6,025,788 A * | 2/2000 | Diduck | G01M 3/18 340/3.4 |
| 6,038,914 A | 3/2000 | Carr et al. | |
| 6,058,519 A | 5/2000 | Quintana | |
| 6,079,252 A | 6/2000 | Tabler et al. | |
| 6,147,613 A | 11/2000 | Doumit | |
| 6,175,310 B1 | 1/2001 | Gott | |
| 6,367,096 B1 | 4/2002 | Quintana | |
| 6,369,714 B2 | 4/2002 | Walter | |
| 6,489,895 B1 | 12/2002 | Apelman | |
| 6,523,562 B2 | 2/2003 | Harper | |
| 6,524,857 B1 * | 2/2003 | Perkins | D06F 39/081 436/3 |
| 6,526,807 B1 | 3/2003 | Doumit et al. | |
| 6,530,259 B1 | 3/2003 | Lawson et al. | |
| 6,577,901 B2 | 6/2003 | Thompson | |
| 6,600,726 B1 | 7/2003 | Nevo et al. | |
| 6,631,801 B2 | 10/2003 | Boyd-Moss et al. | |
| 6,639,517 B1 | 10/2003 | Chapman et al. | |
| 6,647,762 B1 | 11/2003 | Roy | |
| 6,650,244 B1 | 11/2003 | Chen et al. | |
| 6,683,535 B1 * | 1/2004 | Utke | G01M 3/045 200/61.04 |
| 6,722,185 B2 | 4/2004 | Lawson et al. | |
| 6,731,215 B2 | 5/2004 | Harms et al. | |
| 6,778,824 B2 | 8/2004 | Wonak et al. | |
| 6,789,411 B2 | 9/2004 | Roy | |
| 6,865,941 B2 | 3/2005 | Gibbs | |
| 6,873,263 B1 * | 3/2005 | Hohman | G08B 21/20 340/602 |
| 6,877,170 B1 | 4/2005 | Quintana et al. | |
| 6,877,359 B2 | 4/2005 | Huang et al. | |
| 6,891,857 B1 | 5/2005 | Nevo et al. | |
| 6,892,751 B2 | 5/2005 | Sanders | |
| 6,894,988 B1 | 5/2005 | Zehavi | |
| 6,912,373 B2 | 6/2005 | Lee | |
| 6,928,266 B1 | 8/2005 | Nevo et al. | |
| 6,934,862 B2 | 8/2005 | Sharood et al. | |
| 6,934,977 B1 | 8/2005 | Quintana et al. | |
| 6,963,808 B1 | 11/2005 | Addink et al. | |
| 6,978,659 B2 | 12/2005 | Phillips et al. | |
| 6,990,082 B1 | 1/2006 | Zehavi et al. | |
| 6,993,289 B2 | 1/2006 | Janik | |
| 7,032,435 B2 | 4/2006 | Hassenflug | |
| 7,057,507 B1 * | 6/2006 | Sandifer | G01M 3/2807 137/486 |
| 7,061,924 B1 | 6/2006 | Durrant et al. | |
| 7,069,006 B2 | 6/2006 | Wonak et al. | |
| 7,102,504 B2 | 9/2006 | Kates | |
| 7,102,505 B2 | 9/2006 | Kates | |
| 7,119,699 B2 | 10/2006 | King et al. | |
| 7,142,107 B2 | 11/2006 | Kates | |
| 7,142,123 B2 | 11/2006 | Kates | |
| 7,154,862 B2 | 12/2006 | Krzyzanowski | |
| 7,155,213 B1 | 12/2006 | Almeda et al. | |
| 7,190,954 B2 | 3/2007 | Wonak et al. | |
| 7,194,072 B2 | 3/2007 | Gamble | |
| 7,206,645 B2 | 4/2007 | Seguin | |
| 7,218,237 B2 | 5/2007 | Kates | |
| 7,228,726 B2 | 6/2007 | Kates | |
| 7,230,528 B2 | 6/2007 | Kates | |
| 7,239,615 B2 | 7/2007 | Nevo et al. | |
| 7,243,050 B2 | 7/2007 | Armstrong | |
| 7,253,741 B2 | 8/2007 | Fiorletta et al. | |
| 7,283,057 B2 | 10/2007 | Kim | |
| 7,283,913 B2 | 10/2007 | Garnaes | |
| 7,299,009 B2 | 11/2007 | Hussmann | |
| 7,301,451 B2 | 11/2007 | Hastings | |
| 7,304,587 B2 | 12/2007 | Boaz | |
| 7,309,216 B1 | 12/2007 | Spadola, Jr. et al. | |
| 7,330,796 B2 | 2/2008 | Addink et al. | |
| 7,336,168 B2 | 2/2008 | Kates | |
| 7,343,264 B2 | 3/2008 | Tsigiroglou | |
| 7,360,413 B2 | 4/2008 | Jeffries et al. | |
| 7,383,721 B2 | 6/2008 | Parsons et al. | |
| 7,400,264 B2 | 7/2008 | Boaz | |
| 7,403,839 B1 | 7/2008 | Kaplan | |
| 7,411,484 B2 | 8/2008 | Kates | |
| 7,412,876 B2 | 8/2008 | Kates | |
| 7,420,936 B2 | 9/2008 | Nevo et al. | |
| 7,426,369 B2 | 9/2008 | Lee | |
| 7,444,401 B1 | 10/2008 | Keyghobad et al. | |
| 7,477,890 B1 | 1/2009 | Narayanaswami | |
| 7,522,036 B1 | 4/2009 | Preuss et al. | |
| 7,561,057 B2 | 7/2009 | Kates | |
| 7,583,198 B2 | 9/2009 | Kates | |
| 7,605,710 B2 | 10/2009 | Chrnkovich et al. | |
| 7,668,532 B2 | 2/2010 | Shamoon et al. | |
| 7,669,461 B2 | 3/2010 | Kates | |
| 7,680,611 B2 | 3/2010 | Guidi et al. | |
| 7,711,454 B2 | 5/2010 | Addink | |
| 7,734,286 B2 | 6/2010 | Almeda et al. | |
| 7,752,309 B2 | 7/2010 | Keyghobad et al. | |
| 7,783,738 B2 | 8/2010 | Keyghobad et al. | |
| RE41,736 E | 9/2010 | Zehavi | |
| 7,792,946 B2 | 9/2010 | Keyghobad et al. | |
| 7,801,185 B2 | 9/2010 | Krzyzanowski | |

(56) References Cited

U.S. PATENT DOCUMENTS

| | | |
|---|---|---|
| 7,826,725 B2 | 11/2010 | Wolff et al. |
| 7,894,473 B2 | 2/2011 | Raghavendra et al. |
| 7,900,647 B2 | 3/2011 | Tornay |
| 7,908,401 B2 | 3/2011 | Chang |
| 7,920,983 B1 | 4/2011 | Peleg et al. |
| 7,925,212 B2 | 4/2011 | Eisenbach |
| 7,956,760 B2 | 6/2011 | Hill |
| 7,957,697 B2 | 6/2011 | Park et al. |
| 7,973,667 B2 | 7/2011 | Chrnkovich et al. |
| 7,994,927 B2 | 8/2011 | Atassi |
| 8,031,079 B2 | 10/2011 | Kates |
| 8,036,598 B1 | 10/2011 | Zhu |
| 8,140,667 B2 | 3/2012 | Keyghobad et al. |
| 8,145,359 B2 | 3/2012 | Addink |
| 8,154,398 B2 | 4/2012 | Rolf et al. |
| 8,165,057 B2 | 4/2012 | Preston et al. |
| 8,174,398 B2 | 5/2012 | Wien |
| 8,188,873 B2 | 5/2012 | Barth et al. |
| 8,214,494 B1 | 7/2012 | Slavin |
| 8,248,256 B1 | 8/2012 | Gerardi et al. |
| 8,254,901 B2 | 8/2012 | Almeda et al. |
| 8,281,645 B2 | 10/2012 | Dryden |
| 8,325,050 B1 | 12/2012 | Schlachter |
| 8,330,603 B1 | 12/2012 | Gibb |
| 8,340,034 B1 | 12/2012 | Lee et al. |
| 8,347,427 B2 | 1/2013 | Klicpera |
| 8,407,333 B2 | 3/2013 | Keyghobad et al. |
| D680,015 S | 4/2013 | Hauser et al. |
| 8,422,945 B2 | 4/2013 | Doutriaux |
| 8,423,000 B2 | 4/2013 | Dhuna |
| 8,508,373 B2* | 8/2013 | Rice ................ G08B 21/20 340/605 |
| 8,549,131 B2 | 10/2013 | Keyghobad et al. |
| 8,567,757 B2 | 10/2013 | Pitchford et al. |
| 8,568,313 B2 | 10/2013 | Sadhu |
| 8,583,044 B2 | 11/2013 | Dua |
| 8,630,000 B2 | 1/2014 | Chang et al. |
| 8,644,770 B2 | 2/2014 | Nandagopalan et al. |
| 8,667,112 B2 | 3/2014 | Roth et al. |
| 8,710,994 B2 | 4/2014 | Chan |
| 8,786,453 B2 | 7/2014 | Walbert |
| 8,798,527 B2 | 8/2014 | Gaines et al. |
| 8,798,671 B2 | 8/2014 | Grubb |
| 8,807,523 B2 | 8/2014 | Pitchford et al. |
| 8,818,272 B2 | 8/2014 | Paryani |
| 8,825,124 B1 | 9/2014 | Davies et al. |
| 8,831,507 B2 | 9/2014 | Murray et al. |
| 8,831,584 B2 | 9/2014 | Almeda et al. |
| 8,836,522 B2 | 9/2014 | Thorpe et al. |
| 8,851,372 B2 | 10/2014 | Zhou et al. |
| 8,860,568 B1 | 10/2014 | Baker |
| 8,861,469 B1 | 10/2014 | Lee et al. |
| 8,862,158 B2 | 10/2014 | Basir |
| 8,869,587 B1 | 10/2014 | Gibb |
| 8,870,087 B2 | 10/2014 | Pienta et al. |
| 8,887,324 B2 | 11/2014 | Klicpera |
| 8,892,056 B2 | 11/2014 | Nandagopalan et al. |
| 8,893,320 B2 | 11/2014 | Klicpera |
| 8,942,632 B2 | 1/2015 | Shen |
| 8,970,386 B2 | 3/2015 | Scharf |
| 8,985,395 B2 | 3/2015 | Tansey |
| 8,988,231 B2 | 3/2015 | Chen |
| 8,988,232 B1 | 3/2015 | Sloo et al. |
| 9,003,500 B2 | 4/2015 | Oglesbee et al. |
| 9,007,224 B1 | 4/2015 | Fadell et al. |
| 9,007,225 B2 | 4/2015 | Kates |
| 9,019,110 B2 | 4/2015 | Kates |
| 9,019,111 B1 | 4/2015 | Sloo et al. |
| 9,019,120 B2 | 4/2015 | Broniak et al. |
| 9,026,648 B1 | 5/2015 | Slavin |
| 9,044,696 B2 | 6/2015 | Braunheim et al. |
| 9,049,539 B2 | 6/2015 | Sweeney et al. |
| 9,057,453 B2 | 6/2015 | Pitchford et al. |
| 9,061,307 B2 | 6/2015 | Klicpera et al. |
| 9,077,183 B2 | 7/2015 | Thomas et al. |
| 9,105,175 B1 | 8/2015 | Cantolino et al. |
| 9,107,248 B2 | 8/2015 | Chen |
| 9,118,498 B2 | 8/2015 | Lee et al. |
| 9,159,211 B2 | 10/2015 | O'Brien et al. |
| 9,163,977 B2 | 10/2015 | Walbert |
| 9,183,733 B2 | 11/2015 | Kates |
| 9,183,736 B2 | 11/2015 | Sloo et al. |
| 9,189,946 B2 | 11/2015 | Sloo et al. |
| 9,207,659 B1 | 12/2015 | Sami |
| 9,210,576 B1 | 12/2015 | Cope et al. |
| 9,210,646 B2 | 12/2015 | Ruffini et al. |
| 9,218,732 B2 | 12/2015 | Fiedler et al. |
| 9,235,976 B2 | 1/2016 | Sloo et al. |
| 9,245,438 B2 | 1/2016 | Burtner et al. |
| 9,251,696 B2 | 2/2016 | Sloo et al. |
| 9,254,499 B2 | 2/2016 | Klicpera |
| 9,258,298 B2 | 2/2016 | Ansley |
| 9,383,289 B1* | 7/2016 | Meyer ................ G01M 3/16 |
| 9,412,260 B2* | 8/2016 | Kates ................ G08B 1/08 |
| 9,432,763 B2* | 8/2016 | Scharf ................ G01M 3/16 |
| 10,612,217 B2* | 4/2020 | Evans ................ G05D 7/0635 |
| 2001/0004240 A1* | 6/2001 | Freill ................ G08B 21/20 340/625 |
| 2001/0054965 A1 | 12/2001 | Blum et al. |
| 2002/0001462 A1 | 1/2002 | Ho |
| 2002/0033759 A1 | 3/2002 | Morello |
| 2002/0095721 A1 | 7/2002 | Quintana |
| 2002/0097849 A1 | 7/2002 | Berthoud et al. |
| 2003/0023704 A1 | 1/2003 | Lee et al. |
| 2003/0090374 A1* | 5/2003 | Quigley ............ G08B 21/0484 340/506 |
| 2004/0007264 A1* | 1/2004 | Bootka ................ E03C 1/242 137/312 |
| 2004/0051625 A1 | 3/2004 | Nass et al. |
| 2004/0203387 A1 | 10/2004 | Grannan |
| 2005/0024215 A1 | 2/2005 | Roy |
| 2005/0051213 A1* | 3/2005 | Clemens ................ A47L 15/421 137/392 |
| 2005/0120375 A1 | 6/2005 | Elms |
| 2005/0125083 A1 | 6/2005 | Kiko |
| 2005/0135628 A1 | 6/2005 | Dacosta |
| 2005/0210064 A1 | 9/2005 | Caldini et al. |
| 2005/0225335 A1 | 10/2005 | Filipkowski |
| 2005/0248438 A1 | 11/2005 | Hughes et al. |
| 2006/0059977 A1 | 3/2006 | Kates |
| 2006/0072489 A1 | 4/2006 | Toyoshima |
| 2006/0124171 A1 | 6/2006 | Ghazarian et al. |
| 2006/0192678 A1 | 8/2006 | Garabedian |
| 2006/0208912 A1 | 9/2006 | Fiorletta et al. |
| 2006/0234766 A1 | 10/2006 | Gillin et al. |
| 2006/0244616 A1 | 11/2006 | Hill |
| 2006/0246910 A1 | 11/2006 | Petermann |
| 2006/0253525 A1 | 11/2006 | Slota |
| 2006/0270350 A1 | 11/2006 | Kim |
| 2006/0273896 A1 | 12/2006 | Kates |
| 2007/0013547 A1 | 1/2007 | Boaz |
| 2007/0038724 A1 | 2/2007 | Toyoshima |
| 2007/0063833 A1 | 3/2007 | Kates |
| 2007/0076640 A1 | 4/2007 | Bonta et al. |
| 2007/0090059 A1 | 4/2007 | Plummer et al. |
| 2007/0139208 A1 | 6/2007 | Kates |
| 2007/0191991 A1 | 8/2007 | Addink |
| 2007/0229237 A1 | 10/2007 | Kates |
| 2007/0276626 A1 | 11/2007 | Bruffey |
| 2007/0289635 A1 | 12/2007 | Ghazarian et al. |
| 2008/0007431 A1 | 1/2008 | Jacques |
| 2008/0027586 A1 | 1/2008 | Randall et al. |
| 2008/0048883 A1 | 3/2008 | Boaz |
| 2008/0133063 A1 | 6/2008 | Bisson et al. |
| 2008/0141754 A1 | 6/2008 | Kates |
| 2008/0179962 A1* | 7/2008 | Wood ................ G01M 3/16 307/98 |
| 2008/0247760 A1 | 10/2008 | Edmon et al. |
| 2008/0252447 A1* | 10/2008 | Atherton ................ G08B 19/00 340/540 |
| 2009/0153336 A1 | 6/2009 | Kates |
| 2009/0231129 A1 | 9/2009 | Edwards et al. |
| 2009/0235992 A1 | 9/2009 | Armstrong |
| 2009/0240377 A1 | 9/2009 | Batzier et al. |

(56) References Cited

U.S. PATENT DOCUMENTS

| | | |
|---|---|---|
| 2009/0259138 A1 | 10/2009 | Lin et al. |
| 2009/0299660 A1 | 12/2009 | Winter |
| 2010/0016683 A1 | 1/2010 | Lemmers et al. |
| 2010/0156632 A1 | 6/2010 | Hyland et al. |
| 2010/0204839 A1 | 8/2010 | Behm et al. |
| 2010/0206039 A1 | 8/2010 | Kates |
| 2010/0235621 A1* | 9/2010 | Winkler .............. H04W 12/50 713/153 |
| 2010/0245118 A1 | 9/2010 | Lee et al. |
| 2010/0283608 A1 | 11/2010 | Asplund et al. |
| 2010/0295672 A1 | 11/2010 | Hyland et al. |
| 2010/0302047 A1* | 12/2010 | Wood .................... G01M 3/16 340/605 |
| 2010/0328089 A1 | 12/2010 | Eichenstein et al. |
| 2010/0332149 A1 | 12/2010 | Scholpp |
| 2011/0012726 A1 | 1/2011 | Jessiman et al. |
| 2011/0025501 A1 | 2/2011 | Kates |
| 2011/0054700 A1 | 3/2011 | Chan et al. |
| 2011/0061014 A1 | 3/2011 | Frader-Thompson et al. |
| 2011/0068192 A1 | 3/2011 | Klicpera |
| 2011/0077785 A1 | 3/2011 | Nickerson et al. |
| 2011/0093217 A1 | 4/2011 | Kates |
| 2011/0093221 A1* | 4/2011 | Dhanjal ............ H02J 13/00002 702/57 |
| 2011/0128146 A1 | 6/2011 | Hsueh et al. |
| 2011/0130880 A1 | 6/2011 | Nishino et al. |
| 2011/0146805 A1 | 6/2011 | Foster |
| 2011/0166714 A1 | 7/2011 | Stachnik |
| 2011/0178644 A1 | 7/2011 | Picton |
| 2011/0186154 A1 | 8/2011 | Klicpera |
| 2011/0210816 A1 | 9/2011 | Wang |
| 2011/0248857 A1* | 10/2011 | Rutherford ............ G08B 21/16 340/632 |
| 2011/0289561 A1 | 11/2011 | Ivanov et al. |
| 2011/0291845 A1* | 12/2011 | Rice .................... G08B 21/20 340/605 |
| 2012/0019388 A1 | 1/2012 | Kates |
| 2012/0026004 A1 | 2/2012 | Broniak et al. |
| 2012/0065776 A1 | 3/2012 | Czaja et al. |
| 2012/0074967 A1 | 3/2012 | Vokey et al. |
| 2012/0109395 A1 | 5/2012 | Finch et al. |
| 2012/0126990 A1* | 5/2012 | Chan .................... G08B 21/20 340/618 |
| 2012/0130513 A1 | 5/2012 | Hao et al. |
| 2012/0191260 A1 | 7/2012 | Addink |
| 2012/0273069 A1 | 11/2012 | Klicpera et al. |
| 2012/0275927 A1 | 11/2012 | Rhim |
| 2012/0291886 A1 | 11/2012 | Rivera |
| 2012/0326884 A1 | 12/2012 | Cornwall |
| 2013/0024299 A1 | 1/2013 | Wong et al. |
| 2013/0036796 A1* | 2/2013 | Fleury, Jr. .............. G01M 3/00 73/40.5 R |
| 2013/0041601 A1 | 2/2013 | Dintakurti et al. |
| 2013/0049968 A1 | 2/2013 | Fleury, Jr. et al. |
| 2013/0082835 A1 | 4/2013 | Shapiro et al. |
| 2013/0145826 A1 | 6/2013 | Richarz et al. |
| 2013/0170417 A1 | 7/2013 | Thomas et al. |
| 2013/0178165 A1 | 7/2013 | Maag et al. |
| 2013/0214936 A1 | 8/2013 | Shuberth |
| 2013/0241479 A1 | 9/2013 | Wright, Jr. et al. |
| 2013/0306170 A1 | 11/2013 | Rivera |
| 2013/0335203 A1 | 12/2013 | Sun et al. |
| 2014/0005809 A1 | 1/2014 | Frei et al. |
| 2014/0022793 A1 | 1/2014 | Apte et al. |
| 2014/0058690 A1 | 2/2014 | Tian et al. |
| 2014/0064738 A1 | 3/2014 | Chen et al. |
| 2014/0066062 A1 | 3/2014 | Chen et al. |
| 2014/0083182 A1* | 3/2014 | Cantolino .............. G01F 23/00 73/290 R |
| 2014/0085059 A1 | 3/2014 | Chen et al. |
| 2014/0104065 A1 | 4/2014 | Scharf |
| 2014/0104067 A1 | 4/2014 | Chien |
| 2014/0118159 A1 | 5/2014 | Fish et al. |
| 2014/0121786 A1 | 5/2014 | Chen et al. |
| 2014/0121999 A1* | 5/2014 | Bracken ................ G01M 3/243 702/51 |
| 2014/0125496 A1* | 5/2014 | D'Alessandro ..... G01F 23/0069 340/870.11 |
| 2014/0129006 A1 | 5/2014 | Chen et al. |
| 2014/0142730 A1 | 5/2014 | Kim |
| 2014/0152434 A1 | 6/2014 | Frohlick et al. |
| 2014/0159877 A1 | 6/2014 | Huang |
| 2014/0162707 A1 | 6/2014 | Frohlick et al. |
| 2014/0163751 A1 | 6/2014 | Davis et al. |
| 2014/0201315 A1 | 7/2014 | Jacob et al. |
| 2014/0203943 A1 | 7/2014 | Kates |
| 2014/0224341 A1 | 8/2014 | Barkay |
| 2014/0251005 A1 | 9/2014 | Curry et al. |
| 2014/0251478 A1 | 9/2014 | Dolezilek et al. |
| 2014/0275819 A1* | 9/2014 | Kassem ............ A61B 5/14551 600/301 |
| 2014/0292536 A1 | 10/2014 | Barth et al. |
| 2014/0298903 A1 | 10/2014 | Goto et al. |
| 2014/0308898 A1 | 10/2014 | Lee et al. |
| 2014/0313048 A1 | 10/2014 | Sabata et al. |
| 2014/0340238 A1 | 11/2014 | Hyland et al. |
| 2014/0343736 A1* | 11/2014 | Meyer .................. G05D 7/0635 700/283 |
| 2014/0348205 A1* | 11/2014 | Shaw .................... G01M 3/002 374/142 |
| 2014/0351337 A1 | 11/2014 | Pal et al. |
| 2014/0354441 A1 | 12/2014 | Luna |
| 2014/0361887 A1 | 12/2014 | Eskildsen et al. |
| 2014/0364111 A1 | 12/2014 | Almeda et al. |
| 2014/0369231 A1 | 12/2014 | Chen et al. |
| 2015/0000380 A1 | 1/2015 | Cho et al. |
| 2015/0003619 A1 | 1/2015 | Scharf |
| 2015/0011206 A1 | 1/2015 | Wellinger et al. |
| 2015/0015395 A1 | 1/2015 | Liang et al. |
| 2015/0015502 A1 | 1/2015 | Al-Nasser |
| 2015/0044060 A1* | 2/2015 | Kochan, Jr. ............ F04B 49/06 417/36 |
| 2015/0054341 A1 | 2/2015 | Holder et al. |
| 2015/0061868 A1 | 3/2015 | Kates |
| 2015/0061892 A1 | 3/2015 | Kates |
| 2015/0065030 A1 | 3/2015 | Kates |
| 2015/0072620 A1 | 3/2015 | Nandagopalan et al. |
| 2015/0077555 A1 | 3/2015 | Scalisi |
| 2015/0084614 A1* | 3/2015 | Alatainio .............. G01N 27/61 324/71.1 |
| 2015/0088332 A1 | 3/2015 | Bennett |
| 2015/0091723 A1 | 4/2015 | Fiedler et al. |
| 2015/0102932 A1 | 4/2015 | Miller et al. |
| 2015/0102940 A1 | 4/2015 | Keech et al. |
| 2015/0116118 A1 | 4/2015 | Yu |
| 2015/0145643 A1 | 5/2015 | Fadell et al. |
| 2015/0149781 A1 | 5/2015 | Logue |
| 2015/0151956 A1 | 6/2015 | Tansey |
| 2015/0153060 A1 | 6/2015 | Stefanski et al. |
| 2015/0153317 A1 | 6/2015 | Krebs |
| 2015/0154850 A1 | 6/2015 | Fadell et al. |
| 2015/0156030 A1 | 6/2015 | Fadell et al. |
| 2015/0156031 A1 | 6/2015 | Fadell et al. |
| 2015/0170489 A1 | 6/2015 | Mittleman et al. |
| 2015/0179044 A1 | 6/2015 | Wu et al. |
| 2015/0180976 A1 | 6/2015 | Xiao et al. |
| 2015/0183627 A1 | 7/2015 | Tansey, Jr. |
| 2015/0194038 A1 | 7/2015 | Fadell et al. |
| 2015/0195099 A1 | 7/2015 | Imes et al. |
| 2015/0195100 A1 | 7/2015 | Imes et al. |
| 2015/0204701 A1 | 7/2015 | Klicpera |
| 2015/0024531 A1 | 8/2015 | Robbins et al. |
| 2015/0217986 A1 | 8/2015 | Tansey, Jr. |
| 2015/0224525 A1 | 8/2015 | Klicpera |
| 2015/0228419 A1 | 8/2015 | Fadell et al. |
| 2015/0241259 A1 | 8/2015 | Tsai et al. |
| 2015/0247584 A1 | 9/2015 | Singley |
| 2015/0249605 A1 | 9/2015 | Erickson et al. |
| 2015/0256563 A1 | 9/2015 | LeGuen et al. |
| 2015/0257190 A1 | 9/2015 | Erickson et al. |
| 2015/0260581 A1 | 9/2015 | Fadell et al. |
| 2015/0262475 A1 | 9/2015 | Helmy et al. |
| 2015/0268126 A1 | 9/2015 | Jordan |

(56) References Cited

U.S. PATENT DOCUMENTS

| | | |
|---|---|---|
| 2015/0286226 A1 | 10/2015 | Fadell et al. |
| 2015/0308917 A1 | 10/2015 | Soda |
| 2015/0317985 A1 | 11/2015 | Biswas |
| 2015/0323212 A1 | 11/2015 | Warren et al. |
| 2015/0330660 A1 | 11/2015 | Filson et al. |
| 2015/0034791 A1 | 12/2015 | Fadell et al. |
| 2015/0035091 A1 | 12/2015 | Eramian |
| 2015/0348392 A1 | 12/2015 | Burtner et al. |
| 2015/0350893 A1 | 12/2015 | Lee et al. |
| 2015/0354846 A1 | 12/2015 | Hales et al. |
| 2015/0355656 A1 | 12/2015 | Lai et al. |
| 2015/0359406 A1 | 12/2015 | Hering et al. |
| 2015/0365249 A1 | 12/2015 | Shetty et al. |
| 2015/0365787 A1 | 12/2015 | Farrell |
| 2015/0365933 A1 | 12/2015 | Lee et al. |
| 2015/0365986 A1 | 12/2015 | Lee et al. |
| 2015/0366039 A1 | 12/2015 | Noori et al. |
| 2015/0367136 A1 | 12/2015 | Rondoni et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372833 A1 | 12/2015 | Karp |
| 2015/0372834 A1 | 12/2015 | Karp et al. |
| 2015/0372999 A1 | 12/2015 | Pi-Sunyer |
| 2015/0373149 A1 | 12/2015 | Lyons |
| 2015/0374079 A1 | 12/2015 | Zebley |
| 2015/0378715 A1 | 12/2015 | Solnit et al. |
| 2016/0019768 A1 | 1/2016 | Walbert |
| 2016/0024823 A1 | 1/2016 | McAndrew |
| 2016/0025367 A1 | 1/2016 | Matsuoka et al. |
| 2016/0026194 A1 | 1/2016 | Mucignat et al. |
| 2016/0031416 A1 | 2/2016 | Calhoun |
| 2016/0040903 A1 | 2/2016 | Emmons et al. |
| 2016/0041821 A1 | 2/2016 | Erickson et al. |
| 2016/0044447 A1 | 2/2016 | Tetreault et al. |
| 2016/0047160 A1 | 2/2016 | Huynh |
| 2016/0048142 A1 | 2/2016 | Chan et al. |
| 2016/0052140 A1 | 2/2016 | Li |
| 2016/0072177 A1 | 3/2016 | Sharma et al. |
| 2016/0076909 A1 | 3/2016 | Klicpera |
| 2016/0094966 A1 | 3/2016 | Ledingham et al. |
| 2016/0119741 A1 | 4/2016 | Huang et al. |
| 2016/0124401 A1 | 5/2016 | Li |
| 2016/0134737 A1 | 5/2016 | Pulletikurty |
| 2016/0163177 A1 | 6/2016 | Klicpera |
| 2016/0163188 A1 | 6/2016 | Yang |
| 2016/0165387 A1 | 6/2016 | Nhu |
| 2016/0165405 A1 | 6/2016 | Shinozuka et al. |
| 2016/0171866 A1 | 6/2016 | Dupasquier et al. |
| 2016/0179165 A1 | 6/2016 | Lacey |
| 2016/0182247 A1* | 6/2016 | Cregg ............... G05B 15/02 700/9 |
| 2016/0183037 A1 | 6/2016 | Grohman |
| 2016/0189505 A1 | 6/2016 | Boettcher et al. |
| 2016/0190478 A1 | 6/2016 | Nakanotani et al. |
| 2016/0197889 A1 | 7/2016 | Best et al. |
| 2016/0209899 A1 | 7/2016 | Brantner et al. |
| 2016/0212575 A1 | 7/2016 | Nandagopalan et al. |
| 2016/0215933 A1 | 7/2016 | Skelton et al. |
| 2016/0217631 A1 | 7/2016 | Petricoin, Jr. |
| 2016/0219141 A1 | 7/2016 | Kant |
| 2016/0226297 A1 | 8/2016 | Ojala |
| 2016/0226707 A1 | 8/2016 | Schallich et al. |
| 2016/0227150 A1 | 8/2016 | Sun et al. |
| 2016/0234035 A1 | 8/2016 | Boeldt et al. |
| 2016/0234465 A1 | 8/2016 | Binder |
| 2016/0234641 A1 | 8/2016 | Todasco et al. |
| 2016/0234649 A1 | 8/2016 | Finnerty et al. |
| 2016/0234765 A1 | 8/2016 | Tannenbaum et al. |
| 2016/0378301 A1* | 12/2016 | Hirakawa ........... G06F 3/0481 715/815 |
| 2017/0039821 A1* | 2/2017 | Tilley, III .............. E03D 11/16 |
| 2017/0115155 A1 | 4/2017 | Eskildsen et al. |
| 2017/0227415 A1* | 8/2017 | Jang ..................... G01M 3/16 |
| 2017/0298597 A1* | 10/2017 | Hammond .......... G01M 3/2807 |
| 2019/0027013 A1 | 1/2019 | Sale et al. |

FOREIGN PATENT DOCUMENTS

| | | |
|---|---|---|
| CN | 101918800 A | 12/2010 |
| CN | 102046891 A | 5/2011 |
| CN | 102171398 A | 8/2011 |
| DE | 102006043824 | 3/2008 |
| EP | 0062575 A1 | 10/1982 |
| EP | 0580298 A2 | 1/1994 |
| EP | 0656527 A1 | 6/1995 |
| GB | 2365608 | 2/2002 |
| GB | 2442988 | 4/2008 |
| JP | 06-341917 A | 12/1994 |
| JP | 6341917 A | 12/1994 |
| WO | WO2000/048041 | 8/2000 |
| WO | WO2000/052660 | 9/2000 |
| WO | WO0124454 A1 | 4/2001 |
| WO | WO0124455 A1 | 4/2001 |
| WO | WO0124456 A1 | 4/2001 |
| WO | WO0124457 A1 | 4/2001 |
| WO | WO0124458 A1 | 4/2001 |
| WO | WO0135540 A2 | 5/2001 |
| WO | WO0135540 A3 | 5/2001 |
| WO | WO0135578 A1 | 5/2001 |
| WO | WO0163848 A1 | 8/2001 |
| WO | WO2001/095277 | 12/2001 |
| WO | WO0124458 A8 | 5/2002 |
| WO | WO0135540 A9 | 8/2002 |
| WO | WO0124458 A9 | 12/2002 |
| WO | WO0135578 A9 | 12/2002 |
| WO | WO03085616 A1 | 10/2003 |
| WO | WO2004/026708 A1 | 4/2004 |
| WO | WO2005/047990 A2 | 5/2005 |
| WO | WO2005/083939 A1 | 9/2005 |
| WO | WO2005/119609 A2 | 12/2005 |
| WO | WO2005/119609 A3 | 12/2005 |
| WO | WO2006/036513 | 4/2006 |
| WO | WO2006/042053 | 4/2006 |
| WO | WO2006/086178 | 8/2006 |
| WO | WO2006/119185 A2 | 11/2006 |
| WO | WO2006/132745 | 12/2006 |
| WO | WO2007/024217 A1 | 3/2007 |
| WO | WO2007/027342 A1 | 3/2007 |
| WO | WO2007/035219 A1 | 3/2007 |
| WO | WO2007/035385 A2 | 3/2007 |
| WO | WO2007/035385 A3 | 3/2007 |
| WO | WO2007/037830 A1 | 4/2007 |
| WO | WO2007/104320 A2 | 9/2007 |
| WO | WO2007/139842 A2 | 12/2007 |
| WO | WO2008/021462 A2 | 2/2008 |
| WO | WO2009/017512 A1 | 2/2009 |
| WO | WO2009/072682 A1 | 6/2009 |
| WO | WO2009/121138 A1 | 10/2009 |
| WO | WO2010/039045 A1 | 4/2010 |
| WO | WO2010/051287 A1 | 5/2010 |
| WO | WO2010/135587 A1 | 11/2010 |
| WO | WO2011/058561 A2 | 5/2011 |
| WO | WO2012/156964 A1 | 11/2012 |
| WO | WO2013/025526 A1 | 2/2013 |
| WO | WO2013/036564 A2 | 3/2013 |
| WO | WO2013/036564 A3 | 3/2013 |
| WO | WO2014/019039 A1 | 2/2014 |
| WO | WO2014/035615 A1 | 3/2014 |
| WO | WO2014/091513 A2 | 6/2014 |
| WO | WO2014/118126 A1 | 8/2014 |
| WO | WO2014/145438 A4 | 9/2014 |
| WO | WO2014/173432 A1 | 10/2014 |
| WO | WO2014/193824 A1 | 12/2014 |
| WO | WO2015/000492 A1 | 1/2015 |
| WO | WO2015/020975 A1 | 2/2015 |
| WO | WO2015/020975 A9 | 2/2015 |

(56) References Cited

FOREIGN PATENT DOCUMENTS

WO  WO2015/039874 A1  3/2015
WO  WO2015/049412 A1  4/2015

OTHER PUBLICATIONS

Rheem FloodStop Leak Detection System Whole-House Wireless Model, http://www.homedepot.com/p/Rheem-FloodStop-Leak-Detection-System-Whole-House-Wireless-Model-RH99005/203240103#.Ui3v3E1Ok5s, Sep. 9, 2013.
Installing a WaterCop Leak Detection System, http://www.oldtownhome.com/2013/3/18/Installing-a-WaterCop-Leak-Detection-System/, Sep. 9, 2013.
International Search Report and Written Opinion for PCT/IB2016/001954 dated May 26, 2017, 10 pages.
International Preliminary Report on Patentability received for PCT Patent Application No. PCT/IB2016/001954, dated Jul. 12, 2018, 9 pages.

\* cited by examiner

WATER SENSOR

CROSS-REFERENCE TO RELATED APPLICATION

This application is a continuation application of U.S. patent application Ser. No. 16/067,477, filed Jun. 29, 2018, which is a U.S. 371 national phase filing of PCT International Application No. PCT/IB2016/001954, filed Dec. 30, 2016, which claims priority to U.S. Provisional Patent Application Ser. No. 62/273,736, filed on Dec. 31, 2015, the disclosures of which are expressly incorporated by reference herein.

TECHNICAL FIELD

The present invention relates generally to a water sensor for detecting the presence of water in a particular area and, more particularly, to a water sensing system including the water sensor and configured to provide remote alarms.

BACKGROUND

A water sensing device generally senses flood conditions caused by a water level rising above the ground sufficiently to contact electrodes of the sensing device. Improved water sensors are desirable to detect water before a flood condition occurs.

SUMMARY OF DISCLOSED EMBODIMENTS

The present invention relates generally to a water sensor for detecting the presence of water in a particular area. In some embodiments, the water sensor comprises a continuity sensor, and a controller to configure the water sensor and communicate signals generated by the water sensor to a web service. The web service can then transmit alarms and status alerts. The continuity sensor has electrically conductive elements and an electrical circuit configured to change logical state responsive to water bridging an elongate gap between the electrically conductive elements.

In some embodiments, the water sensor comprises a housing including a top portion and a bottom portion; a controller positioned within the housing; a power source positioned within the housing and electrically coupled to the controller to energize the controller; and a continuity sensor electrically coupled to the controller and including a first elongate member adjacent a second elongate member with an elongate gap therebetween, the first elongate member and the second elongate member extending along one or more surfaces of the housing, and control logic structured to transition from a first logical state to a second logical state responsive to water bridging the elongate gap, wherein the controller is structured to transmit a wireless water detection signal responsive to the continuity sensor transitioning to the second logical state.

In some embodiments, a method of detecting water is provided which is implemented with a water sensor comprising a housing including a top portion and a bottom portion; a controller positioned within the housing; a power source positioned within the housing and electrically coupled to the controller to energize the controller; and a continuity sensor electrically coupled to the controller and including a first elongate member adjacent a second elongate member with a elongate gap therebetween, the first elongate member and the second elongate member extending along one or more surfaces of the housing, and control logic structured to transition from a first logical state to a second logical state responsive to water bridging the elongate gap, wherein the controller is structured to transmit a wireless water detection signal responsive to the continuity sensor transitioning to the second logical state. The method comprises, by the water sensor, wherein the controller comprises a wireless personal area network (WPAN) controller communicatively coupled to a wireless local area network (WLAN) controller: the continuity sensor transitioning from the first logical state to the second logical state responsive to the water bridging the elongate gap; the WPAN controller transitioning from the inactive state to the active state responsive to the continuity sensor transitioning from the first logical state to the second logical state; the WLAN controller transitioning from an inactive state to an active state responsive to a signal from the WPAN controller transmitted while the WPAN controller is in the active state; and the WLAN controller transmitting a water detection signal after transitioning to the active state and transitioning to the inactive state after transmitting the water detection signal.

In some embodiments, a method of detecting water is provided which is implemented with a water sensor a housing including a top portion and a bottom portion; a controller positioned within the housing; a power source positioned within the housing and electrically coupled to the controller to energize the controller; and a continuity sensor electrically coupled to the controller and including a first elongate member adjacent a second elongate member with a elongate gap therebetween, the first elongate member and the second elongate member extending along one or more surfaces of the housing, and control logic structured to transition from a first logical state to a second logical state responsive to water bridging the elongate gap, wherein the controller is structured to transmit a wireless water detection signal responsive to the continuity sensor transitioning to the second logical state. The method comprises: positioning a water sensor as in claim 1 in a desired location; pairing the water sensor with an electronic device to form a wireless personal area network (WPAN); obtaining networking information from a web service with the electronic device, the networking information corresponding to an access point communicatively coupled to the web service; the electronic device transmitting the networking information to the water sensor through the WPAN; the water sensor detecting a presence of water; and the water sensor transmitting a wireless water presence signal to the access point.

Additional features and advantages of the present invention will become apparent to those skilled in the art upon consideration of the following detailed description of the illustrative embodiments.

BRIEF DESCRIPTION OF THE DRAWINGS

The detailed description of the drawings particularly refers to the accompanying figures in which.

Figure 1:
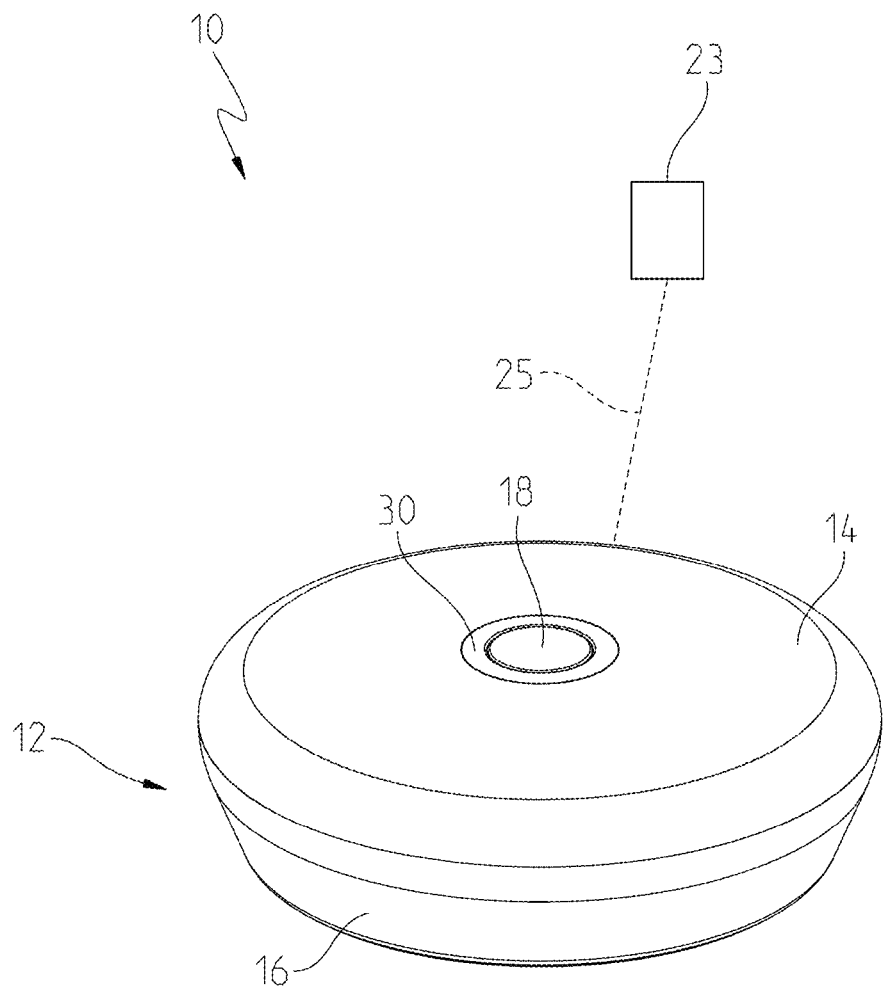
FIG. 1 is a perspective view of an embodiment of a water sensor.
Figure 2:
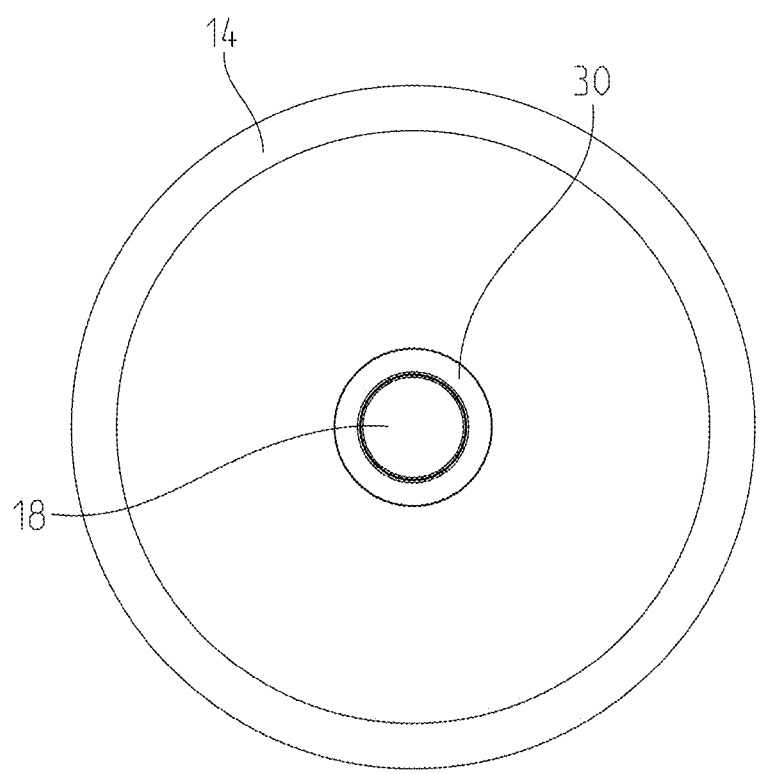
FIGS. 2 to 5 are top elevation, bottom perspective, bottom elevation, and plan views of the water sensor of FIG. 1.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION OF DISCLOSED EMBODIMENTS

The embodiments of the invention described herein are not intended to be exhaustive or to limit the invention to precise forms disclosed. Rather, the embodiments elected for description have been chosen to enable one skilled in the art to practice the invention. It will be understood that no limitation of the scope of the invention is thereby intended. The invention includes any alterations and further modifications in the illustrated devices and described methods and further applications of the principles of the invention which would normally occur to one skilled in the art to which the invention relates.

Except where a contrary intent is expressly stated, terms are used in their singular form for clarity and are intended to include their plural form.

As used herein, the terms "comprises," "comprising," "containing," and "having" and the like denote an open transition meaning that the claim in which the open transition is used is not limited to the elements following the transitional term. The terms "consisting of" or "consists of" denote closed transitions.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Referring to FIGS. 1 to 9, an embodiment of a water sensor 10 includes a housing 12 having a top portion 14 and a bottom portion 16, an actuating mechanism 18, and a visual indicator 30 surrounding actuating mechanism 18. To facilitate communications and perform the functions described below, water sensor 10 includes a controller 20, a power source 22, and conductive elements to, described below with reference to FIGS. 6, 7, and 10. Water sensor 10 is structured to form a wireless connection 25 with an electronic device 23. Communications between water sensor 10 and various electronic devices are described below with reference to FIGS. 10 and 11.

Figure 3:
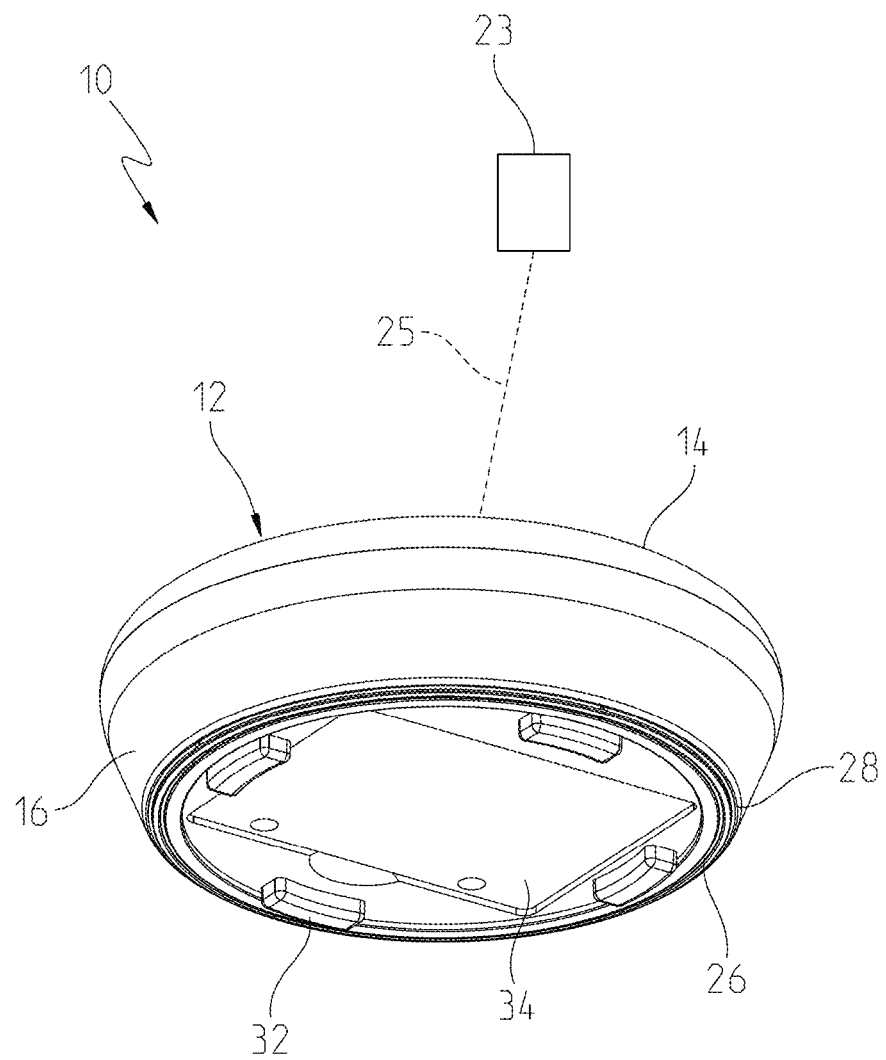
Figure 4:
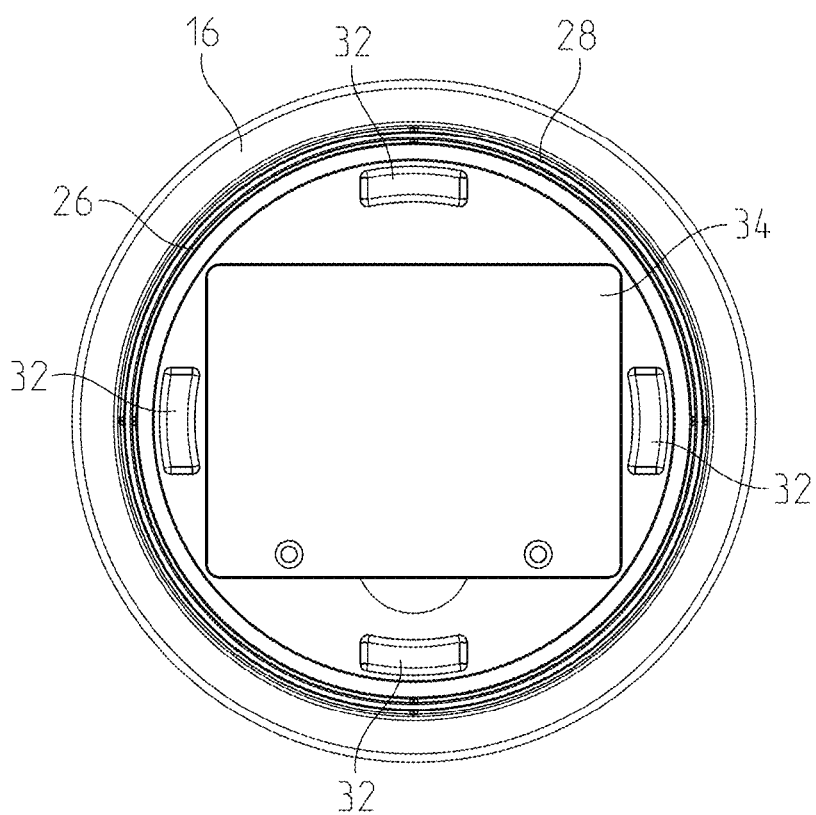
Figure 8:
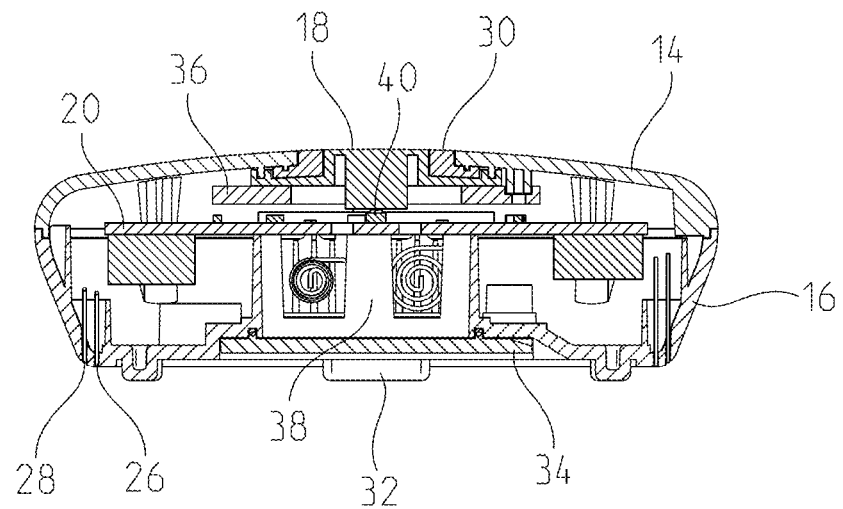
FIG. 8 is a first cross-sectional plan view of the water sensor of FIG. 1.
Figure 9:
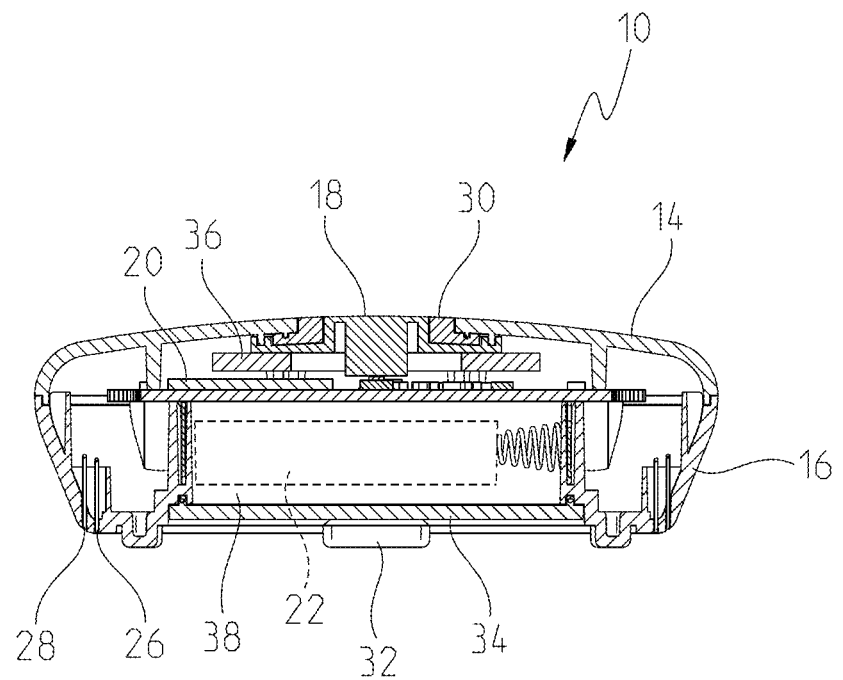
FIG. 9 is a second cross-sectional plan view of the water sensor of FIG. 1, rotated 90 degrees from the view of FIG. 8.

FIG. 3 is a bottom perspective view of water sensor 10 illustrating a plurality of supports 32, and an access cover 34 disposed about the bottom surface of bottom portion 16. Water sensor 10 generally includes a continuity sensor 24 comprising at least two electrically conductive elements disposed with a elongate gap therebetween. When water bridges the elongate gap between the two electrically conductive elements, an electrical circuit of continuity sensor 24 transitions from a first to a second logical state and controller 20 detects the transition. The electrically conductive elements may comprise a pair of elongate elements arranged with a elongate gap therebetween, wherein the elongate gap may be about or less than 3.0 millimeters and may extend substantially along the entire length of the elongate elements. The elongate gap may be constant along the length of the elongate elements. In some embodiments, the first elongate member and the second elongate member extend along one or more surfaces of the housing. The first and second elongate members may extend minimally from the surfaces or may be flush with or embedded in the surfaces. As shown in FIG. 8, one elongate member extends about the bottom surface of the housing and is substantially flush therewith, while the other is embedded in a radiused corner between the bottom and lateral surfaces of the housing. As used herein, elongate refers to an element having substantially longer length than width. In one example, at least one of the elongate elements is on a common plane with a bottom surface of housing 12 of water sensor 10. In another example, both elongate elements are disposed on a lateral wall of housing 12. If housing 12 comprises a circular bottom surface, the elongate elements may span at least 300 degrees about a center of the bottom surface. If housing 12 comprises an oval bottom surface, the elongate elements may span at least 70% of the length of the major axis of the oval. More generally, the length of the elongate elements is greater than 50% of a bottom surface length to increase the likelihood of detection of water falling on housing 12. In some examples, the elongate elements are segmented, in which case the length of the elongate elements shall be construed as the sum of the lengths of the segments. The segments may be electrically coupled or isolated from each other.

In some embodiments, the two electrically conductive elements extend substantially circumferentially (i.e., generally in a circumference or spanning 360 degrees) about the bottom surface of bottom portion 16 of housing 12. In the present embodiment, the at least two conductive elements include an electrically conductive inner loop 26 and an electrically conductive outer loop 28, wherein outer loop 28 is separated by a elongate gap from inner loop 26. In various illustrative embodiments, inner loop 26 and outer loop 28 may be molded into the bottom surface or lateral surface of bottom portion 16. When water bridges the elongate gap, continuity sensor 24 transitions logical states and the transition is detected by controller 20.

Supports 32 are generally spaced about a bottom surface of bottom portion 16, and hold the bottom surface of water sensor 10 above a support surface. In one example, supports 32 hold water sensor 10 a distance "d" above a support surface level denoted as "H0" as described more fully with reference to FIG. 21. In one example "d" is about 2.5 millimeters, or 0.100 inches. Advantageously, water is detected before a flood sufficient to cause the water level to rise by "d" over the entire support surface (e.g. a basement floor). In variations of the present embodiment, at least one of inner loop 26 and outer loop 28 may include an upper portion and a lower portion, wherein the lower portion extends below the bottom surface of bottom portion 16. In one embodiment, the lower portion defines supports 32 and holds water sensor 10 on the support surface. In another variation of the present embodiment, both loops 26 and 28 are shaped as waveforms including lower and upper portions such that the lower portions support water sensor 10 above the support surface, wherein the lower portions of loops 26, 28 include approximately 3 or 4 protrusions that form supports 32. Access cover 34 is positioned flush with the bottom surface of bottom portion 16. Access cover 34 provides access to a power source 22 (shown in FIG. 9) comprising a power source, to enable replacement of the power source. Access cover 34 may be coupled to bottom portion 16 via a conventional fastener, such as a clip.

Figure 5:
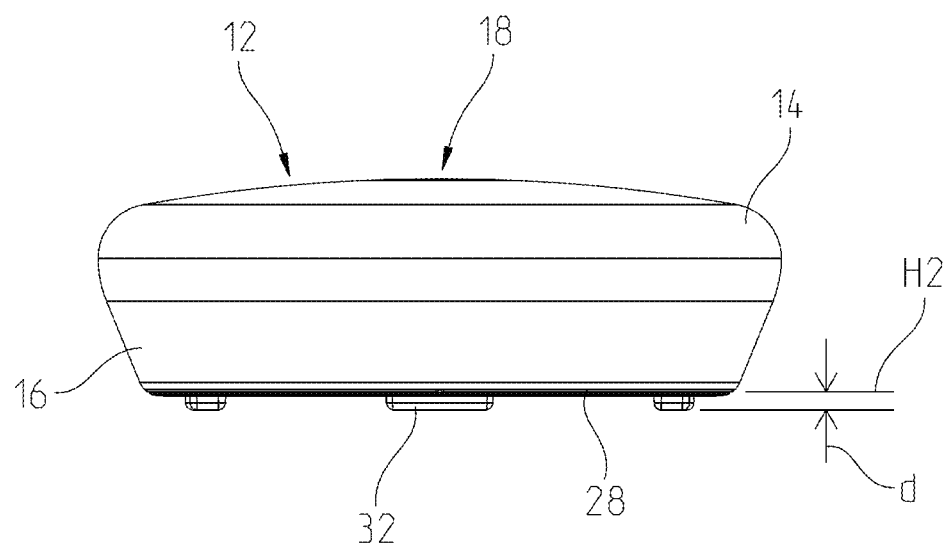

As best seen in FIG. 5, top portion 14 is curved to direct water from the top surface of top portion 14, along the side walls of bottom portion 16, to loops 26, 28 to trigger detection of the presence of water. In various illustrative embodiments, the top surface of top portion 14 may be convex (i.e., curved in multiple planes), while the bottom portion includes inwardly angled or tapered side walls configured to cause water droplets to follow the contour of water sensor 10, as described in detail with reference to FIG. 27.

Figure 6:
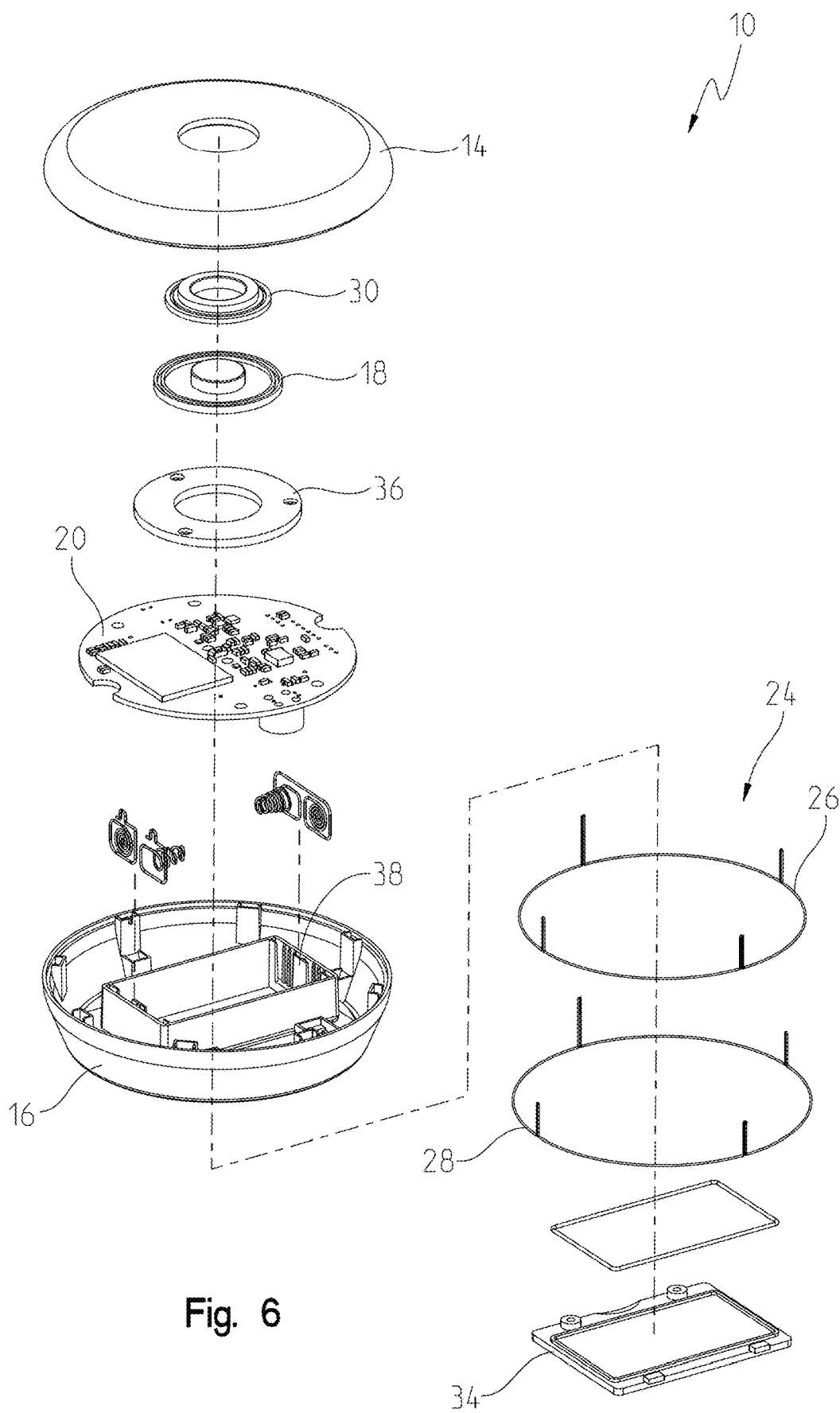
FIGS. 6 and 7 are top and bottom exploded perspective views of the water sensor of FIG. 1.
Figure 7:
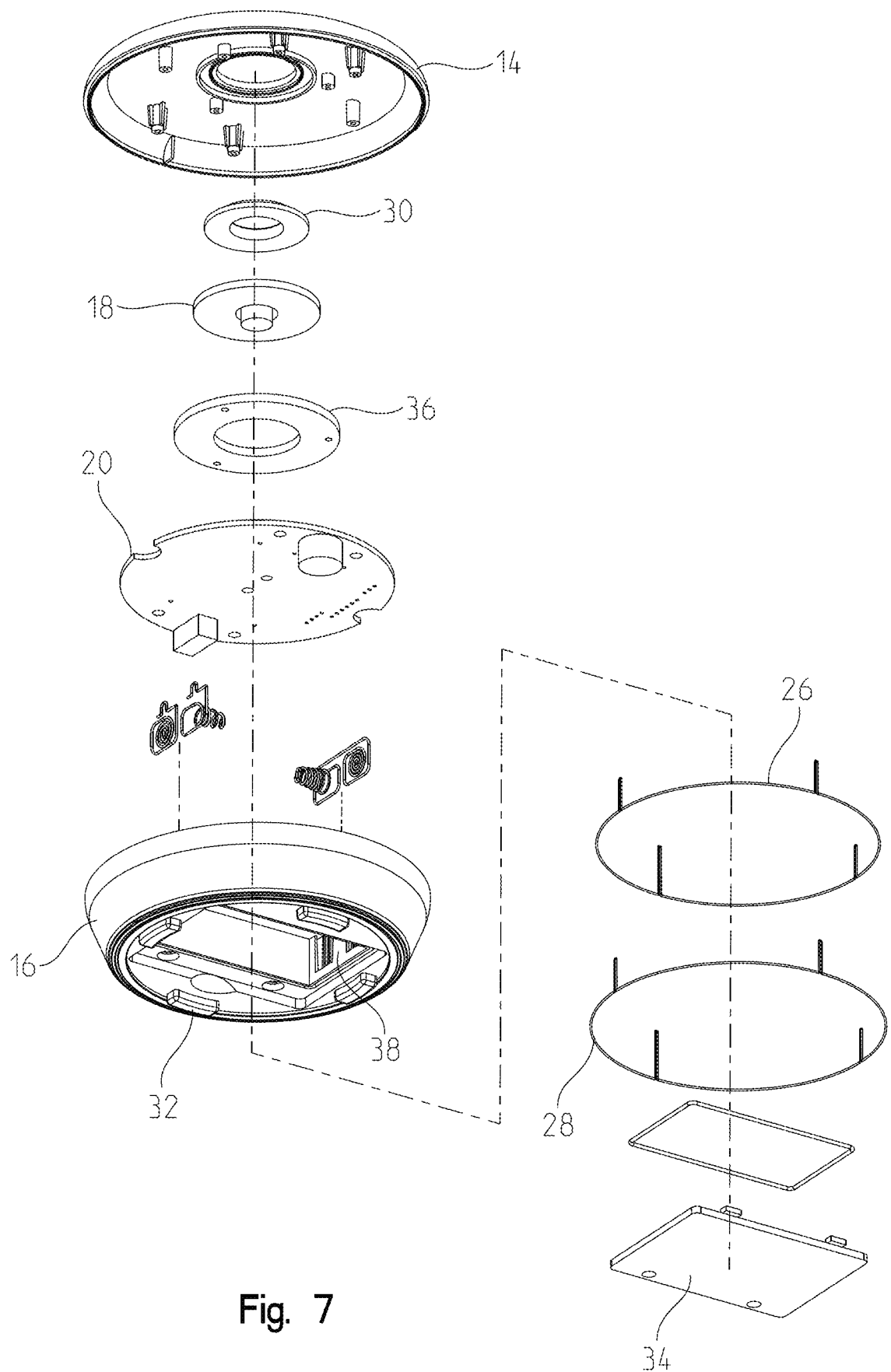

FIGS. 6 and 7 are exploded views of water sensor 10. As seen therein, top portion 14 of housing 12 has an aperture through which actuating mechanism 18 protrudes. Intermediate actuating mechanism 18 and top portion 14 is a visual indicator 30, which is comprised of translucent material to permit a light source to emit a light therethrough. The light source may comprise one or more light emitting diodes (LEDs). The LEDs may emit light of various colors. In various illustrative embodiments, the LEDs emit a green color when water sensor 10 is in operating condition and blink and/or emit a different color when water sensor 10 is not in operating condition. Furthermore, during the pairing/coupling process between water sensor 10 and electrical device 23 (described with reference to FIGS. 10 and 11), visual indicator 30 may visually alert the user when the pairing/coupling has been successfully completed by changing colors and/or blinking or if an error has occurred in the pairing/coupling process by changing colors and/or blinking. A spacer 36 is positioned between actuating mechanism 18 and controller 20 and supports a periphery of actuating mechanism 18. In various illustrative embodiments, actuating mechanism 18 may be a button centered about top portion 14. Furthermore, actuating mechanism 18 in an extended position may be flush with the top surface of top portion 14. Spacer 36 is supported by controller 20 by resilient means which elevate spacer 36 and actuating mechanism 18 but also permit retraction thereof upon actuation by a user. Upon said retraction actuating mechanism 18 actuates a switch 40 (described with reference to FIG. 8) coupled to controller 20 which controller 20 senses to detect actuation of actuating mechanism 18.

Figure 41:
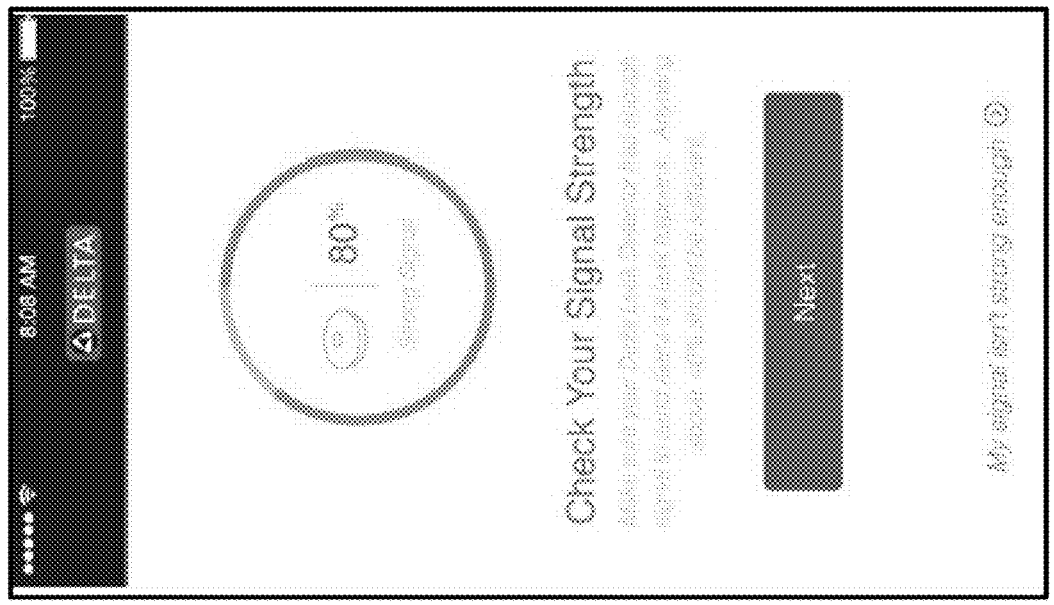

Actuating mechanism 18 may be engaged or depressed to cause several different events to occur. First, if water sensor 10 is not yet wirelessly coupled to electronic device 23, the engagement of actuating mechanism 18 may cause water sensor 10 to pair or connect with electronic device 23 via wireless connection 25. If the connection between electronic device 23 and water sensor 10 has been interrupted or is in error, the engagement of actuating mechanism 18 may cause the connection between water sensor 10 and electronic device 23 to be reset or repaired. Furthermore, the engagement of actuating mechanism 18 may be used to cause water sensor 10 to wake-up and/or check-in with electronic device 23 via wireless connection 25. When water sensor 10 is checking-in with electronic device 23, it may transmit a signal strength representative of a wireless local area network (WLAN) signal received from a WLAN access point, a detection signal or a status signal, among others. The signal strength may be designated in bars, as a percentage, as strong/weak, or any other designation indicative of signal strength. Also, actuation of actuating mechanism 18 may silence an audible alarm generated by water sensor 10. A signal strength of 80% is illustrated in FIG. 41. An example WLAN technology utilizes IEEE 802.11 standards and is marketed under the Wi-Fi brand name.

Controller 20 may generally be mounted on a circuit board positioned within housing 12. In various embodiments, controller 20 may be positioned above power source housing 38. In one embodiment, controller 20 is positioned intermediate actuating mechanism 18 and power source 22. Example power sources comprise one or more batteries, including rechargeable batteries. Controller 20 may be communicatively coupled to audible indicator 80 (shown in FIG. 10) to command audible indicator 80 to emit a sound when water has been detected or an error has occurred. Example audible indicators include a speaker and a buzzer. The sound may be caused by vibration of the audible indicator. The audible indicator may be reset or turned off by pushing actuating mechanism 18. A schematic diagram of an embodiment of controller 20 is described with reference to FIG. 10.

Figure 10:
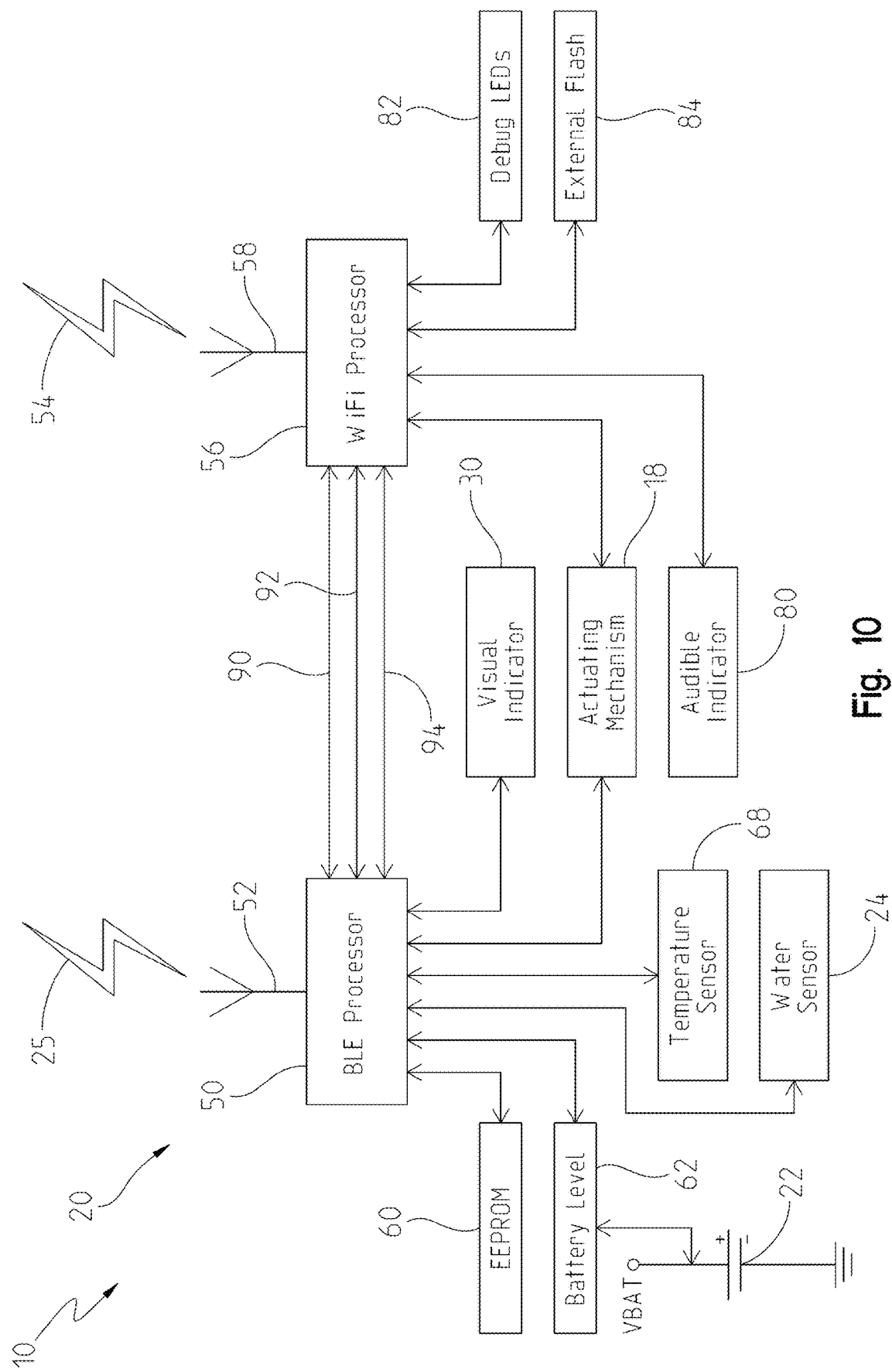
FIG. 10 is schematic diagram of an embodiment of a water sensor.

Referring to FIG. 10, in some embodiments controller 20 comprises a wireless personal area network (WPAN) processor 50 commutatively coupled to a WLAN processor 56. Example WPAN technologies include Bluetooth, ZigBee, Z-Wave, and IrDA technologies. Generally, WPAN technologies have a range of a few (<5) meters while WLAN technologies have much longer range. WPAN processor 50 is coupled to an antenna 52 configured to transmit wireless signal 25. Electrically coupled to WPAN processor 50 are a programmable memory 60, illustratively an electrically erasable programmable memory (EEPROM), a battery voltage level sensor 62 to sense a voltage level of power source 22, a temperature sensor 68, and a continuity sensor 24 comprising the previously described two or more electrical conductive elements. Power source 22 is electrically coupled to power WPAN processor 50 and WLAN processor 56. Continuity sensor 24, actuating mechanism 18, and visual indicator 30 are connected to WPAN processor 50 via general purpose input/output (GPIO) contacts and are programmed to interrupt a running program responsive to activation of actuating mechanism 18 or transition of a logical state of a detection circuit of a continuity sensor as described above. Temperature sensor 68 and battery voltage level sensor 62 are connected to contacts in WPAN processor 50 connected to analog to digital converters (ADC) comprised in WPAN processor 50. The ADCs converts voltages corresponding to the temperature and battery voltages and convert the voltages to digital signals read by programs processed by WPAN processor 50 at periodic intervals. Also, WPAN processor 50 comprises control logic structured to interrupt a running program if the GPIO input coupled to continuity sensor 24 indicates the presence of water. Universal asynchronous receiver/transmitters (UARTs) communicatively couple WPAN processor 50 to WLAN processor 56 over a communication line 90. WPAN processor 50 communicates a WLAN enable command over a WLAN enable line 92.

As used herein the term "control logic" includes software and/or firmware executing on one or more programmable processors, application-specific integrated circuits, field-programmable gate arrays, digital signal processors, hard-wired circuits, or combinations thereof. For example, in various embodiments controller 20 may comprise or have access to the control logic. Therefore, in accordance with the embodiments, various logic may be implemented in any appropriate fashion and would remain in accordance with the embodiments herein disclosed. A non-transitory machine-readable medium comprising control logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory machine-readable medium, or memory, may include random access memory (RAM), read-only memory (ROM), erasable programmable read-only memory (e.g., EPROM, EEPROM, or Flash memory), electronically programmable ROM (EPROM), magnetic disk storage, and any other medium which can be used to carry or store processing instructions and data structures and which can be accessed by a general purpose or special purpose computer or other processing device.

Continuity sensor 24 may comprise a first detection circuit comprising an output contact coupled to the GPIO input of WPAN processor 50 and an input contact coupled to one of the conductive elements. The other of the conductive elements is connected to a voltage supply. When water bridges the elongate gap between the conductive elements, electrons flow from the voltage supply to the first conductive element, and through the water to the second conductive element. The elongate gap between the conductive elements and the impurity of the water determines the amount of current that flows through the gap. The first conductive element may be connected between a Zener diode and the voltage supply, with the Zener diode coupled to ground. The second conductive element may be connected between a Zener diode (grounded) and a resistor (R1) that is connected to the base of a first transistor. The collector of the first transistor is connected to a second resistor (R2) that is connected to the base of a second transistor. The second transistor's collector is connected to the voltage supply and its emitter is connected to the output contact and through a third resistor (R3) to ground. Thus, water bridging the gap turns on the first transistor, which turns on the second transistor. The current drawn by the GPIO input is drawn through the second transistor only and can be controlled by the third resistor. Generally, any circuit component (e.g. transistor, opto-coupler, inductor) may be coupled to the output contact and the conductive members in any known manner that will produce two different voltage levels responsive to the presence or absence of water between them, which levels are sufficiently high or low to be recognized as logical high or low signals (e.g. ON or OFF) by WPAN processor 50.

WLAN processor 56 is coupled with an antenna 58 configured to transmit a wireless signal 54 to a web service 112 via an access point 104 (both shown in FIG. 11) and Internet 110. WLAN processor 56 is communicatively coupled to audible indicator 80, to a number of light emitting diodes (LEDs) 82 provided to facilitate debugging of water sensor 10, and to an external flash memory 84 which comprises programs processed by WLAN processor 56 as described herein. WPAN processor 50 may cause WLAN processor 56 to emit an alarm via a command transmitted over a GPIO line 94 or via communication line 90.

WPAN processor 50 is programmed to cause an alarm if water is detected, and to periodically communicate status information including temperature and voltage levels. Control logic is structured to compare the voltage of the battery level to a threshold indicative of a minimum charge and the signal from the temperature sensor to a threshold indicative of a high temperature. If the GPIO input coupled to continuity sensor 24 indicates the presence of water, WPAN processor 50 interrupts processing of the control logic and promptly commands WLAN processor 56 over line 92 to wake up, then commands WLAN processor 56 to communicate a water detection signal to web service 112 indicating a water alarm. Water sensor 10 may communicate the status information and also trigger an audible alarm via audible indicator 80. In a first example, the actual values of temperature and voltage are transmitted periodically by the control logic, and web service 112 determines whether to issue an alarm corresponding to the battery or temperature values. In a second example, the comparison to the thresholds is performed by WPAN processor 50 and values indicative of a temperature above the high temperature threshold or battery voltage below a low battery voltage are transmitted periodically to the web service. In the second example, WPAN processor 50 may generate the low voltage or high temperature alarm even when disconnected from the WLAN connection. In addition to detecting and communicating the leak alarm, WPAN processor 50 may generate an audible alarm, even when disconnected from the WLAN connection.

In some embodiments, a user may program the low voltage and high temperature thresholds via electronic device 23 and wireless connection 25. Actuating mechanism 18 may be actuated to silence or acknowledge the alarm. In one example, a low temperature threshold may also be programmed.

In some embodiments, a user may program the low voltage and high temperature thresholds via web service 112. In one example, a low temperature threshold may also be programmed.

Advantageously, WPAN processor 50 and WLAN processor 56 are configured to minimize energy consumption.

WPAN processor 50 may comprise a Bluetooth low energy (BLE) processor which comprises a sleep state and an active state. In the sleep state, the BLE processor merely monitors selected parameters, such as the water sensor GPIO input or an internal clock, and upon detecting a transition therein transitions from the sleep to the active mode. WLAN processor 56 also includes a sleep and an active mode, and consumes significantly more energy to transmit wireless WLAN signals than the BLE processor consumes to transmit WPAN signals. Upon transitioning to the active mode, the BLE processor issues a command to wake-up WLAN processor 56 and transmit the respective signals. WLAN processor 56 transmits the signals via WLAN antenna 58, performs various communications related functions, and then transitions back to the sleep state, to conserve energy. Therefore, WLAN processor 56 is only in the active state when communication of data to web service 112 is mandated by WPAN processor 50, and WPAN processor 50 is only active responsive to detection of water or expiration of various clock intervals. Accordingly, water sensor 10 can operate for long periods of time as energy consumption is substantially reduced in contrast with devices not configured as described herein.

Figure 11:
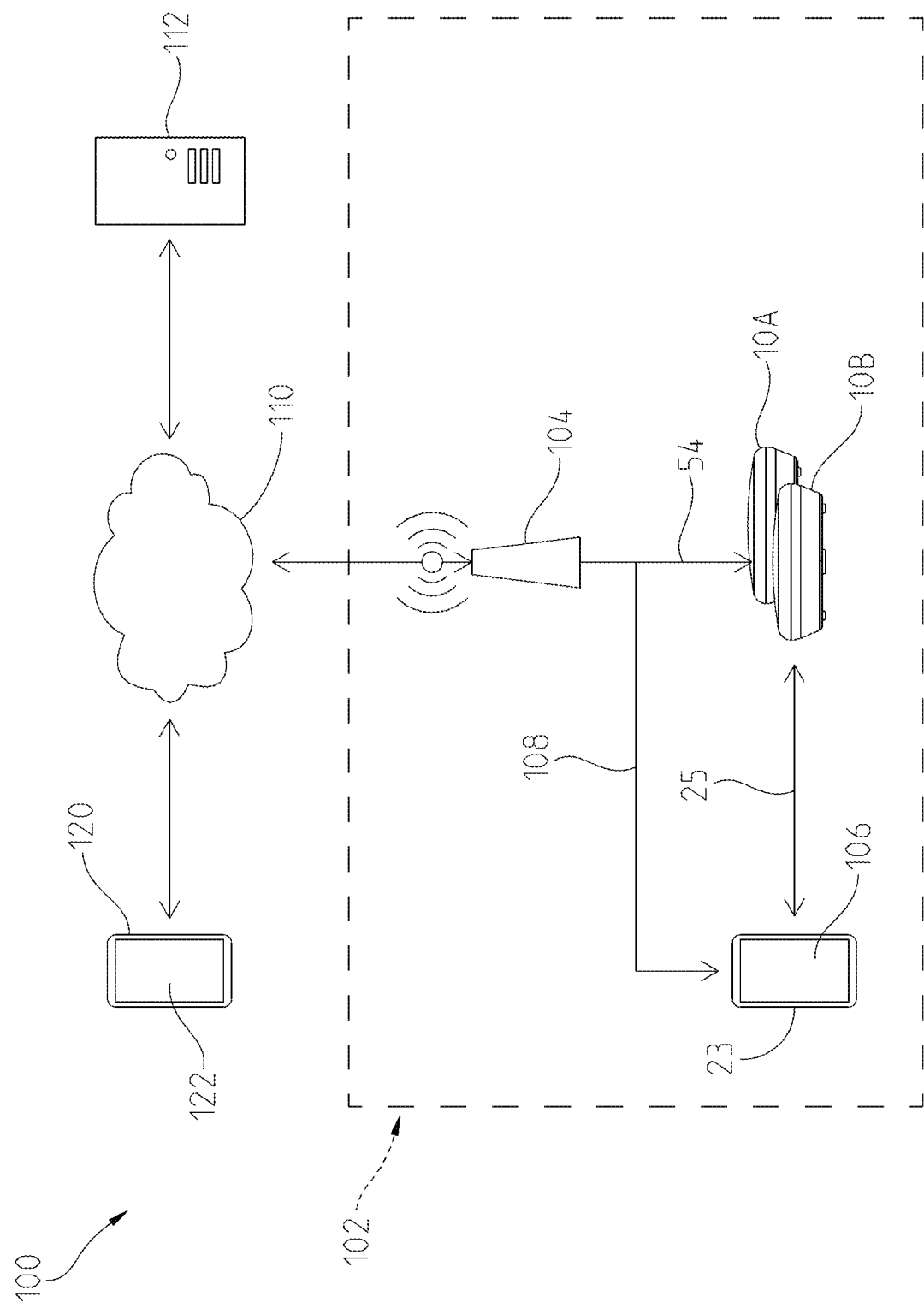
FIG. 11 is schematic diagram of an embodiment of a water sensing system including the water sensor of FIG. 10.

Operation of water sensor 10 will now be described with reference to FIG. 11. In general, a method of using water sensor 10 includes positioning water sensor 10 in a desired location, pairing water sensor 10 with electronic device 23, using electronic device 23 to configure water sensor 10 to communicate with web service 112, activating water sensor 10 to detect leaks, and receiving an alert responsive to detection of water by water sensor 10. Positioning water sensor 10 in a desired location may comprise positioning multiple water sensors 10 in multiple locations, and configuring water sensor 10 may comprise identifying the desired location of each of the multiple water sensors 10. A system 100 comprises a water sensor 10a and a water sensor 10b. Water sensors 10a, 10b may comprise any embodiment of a water sensor described herein. The nomenclature "a" and "b" merely denotes the presence of two water sensors, although additional water sensors may be included. Water sensors 10a, 10b may be, at different times or concurrently, be wirelessly commutatively coupled to electronic device 23 by wireless signal 25 and/or to web service 112 via wireless signal 54 through access point 104 and the Internet 110. Web service 112 may be commutatively coupled via Internet 110 to an electronic device 120 having a graphical user interface (GUI) 122. Electronic device 23 comprises a GUI 106 and may be commutatively coupled to web service 112 via a wireless signal 108 or a telecommunications cellular signal (not shown). In one example, electronic device 23 is wirelessly commutatively coupled to water sensors 10a, 10b via a Bluetooth protocol and to web service 112 via a Wi-Fi protocol. Similarly, water sensors 10a, 10b are wirelessly commutatively coupled via the Bluetooth protocol to electronic device 23 and to web service 112 via a Wi-Fi protocol. Access point 104 may be comprised by an internet switch or router. A local environment 102 is denoted, including water sensors 10a, 10b and access point 104. Local environment 102 may comprise a building including a house, factory, business office, or any other building comprising water systems. Web service 112 is located remotely from local environment 102 and is outside the reach of wireless connection 25.

Figure 12:
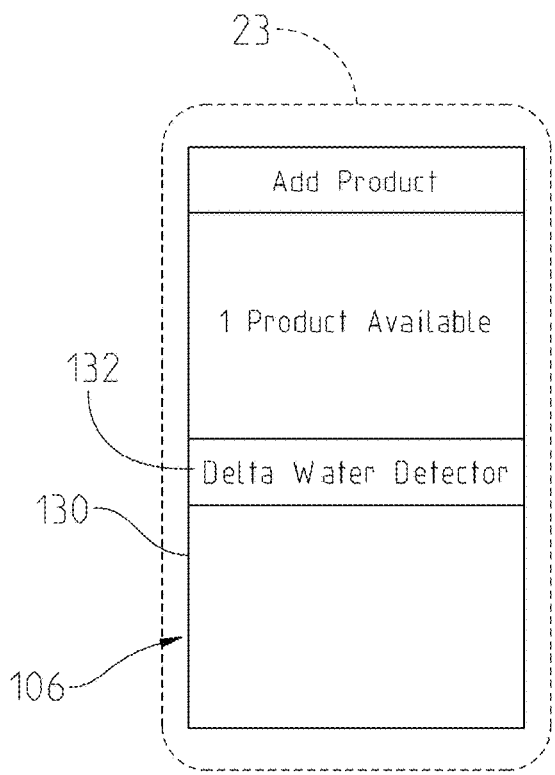
FIGS. 12 to 19 are schematic diagrams of an embodiment of a graphical user interface communicatively coupled with the water sensor of FIG. 10.
Figure 13:
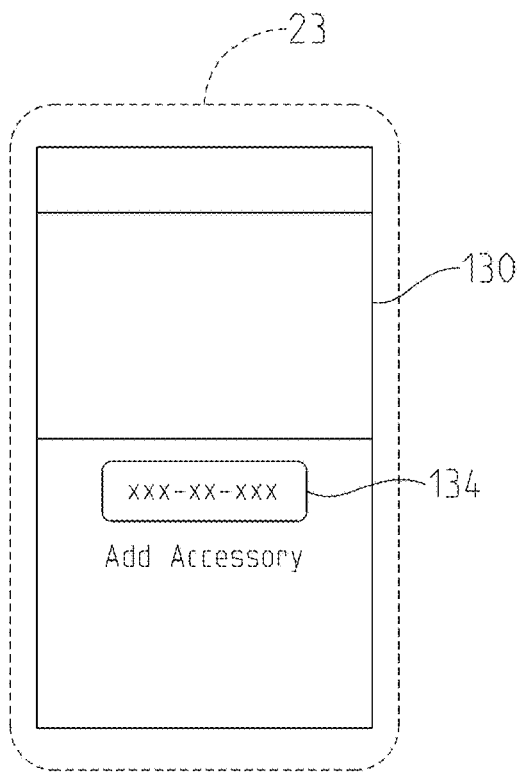
Figure 14:
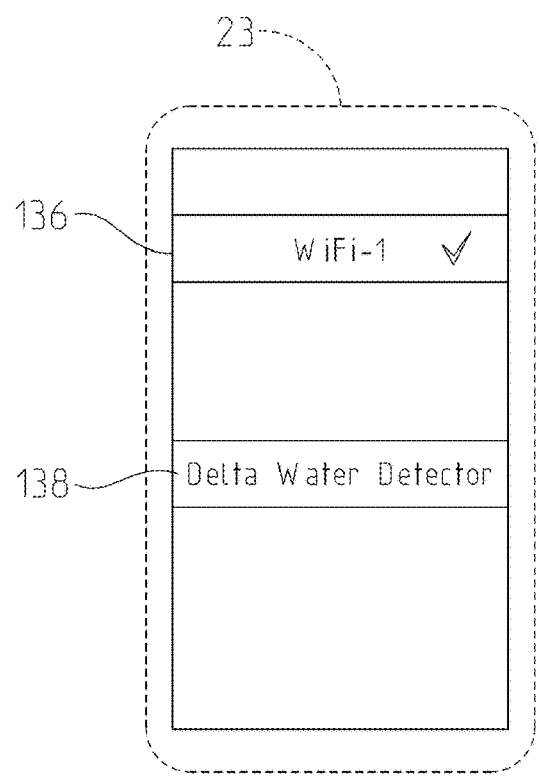
Figure 15:
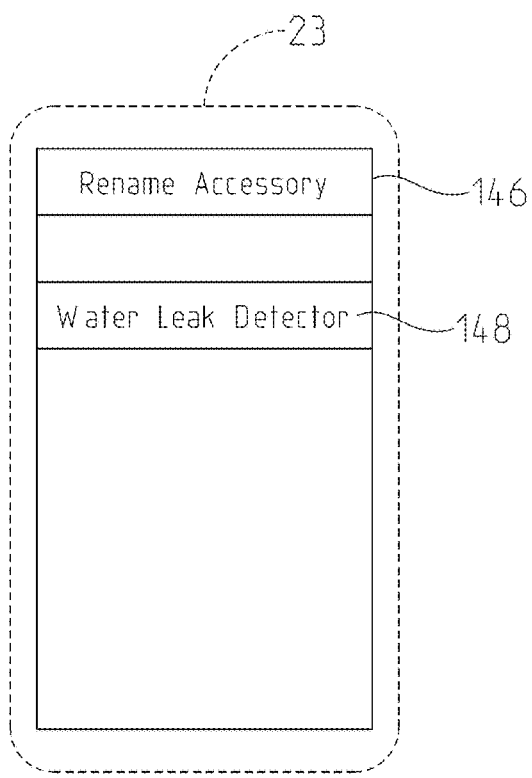

Water sensors 10, 10a, 10b, and any other water sensor in accordance with the present disclosure, are configured via electronic device 23 to communicate with web service 112. Configuration comprises pairing of electronic device 23 with a water sensor using GUI 106. An example pairing process will now be described with reference to FIGS. 12 to 15, in which a screen 130 of electronic device 23 displays pages of GUI 106. FIG. 12 illustrates a page ("Add Product") in which electronic device 23 presents an image 132 to communicate detection of a water sensor. The water sensor emitted a "ping" signal to enable devices within range of wireless signal 25 emitted by the water sensor to detect the ping, as is well known in the art of personal area networks, including Bluetooth networks. The ping signal may have been emitted responsive to actuation by a user of actuating mechanism 18. The user may then recognize the detected water detection by touching screen 106 over image 132. Responsive to such recognition, a data entry field 134 is presented by GUI 106 (shown in FIG. 14) with which the user can enter a serial number of the water sensor. Upon entry of a serial number in the correct format, GUI 106 then displays a screen including an image 138 (shown in FIG. 14) to show that the water detector was paired. Image 138 shows the default name of the paired water sensor. GUI 106 may present a page including images 146 and 148 to enable the user to select a paired water sensor (e.g. by touching screen 130 over image 148 to select the corresponding sensor) and may then present a data entry field (not shown) with which the user can rename the paired water sensor. Multiple images 148 may be presented corresponding to multiple paired water sensors (e.g. 10a and 10b). The user may rename the water sensors with reference to their location. When web service 112 transmits alarms, it will do so utilizing the names of the water sensors. Thus the user may select names that enable the user to recognize the water sensor and determine how to respond to the alarm based on the location of the water sensor.

Examples of electronic device 23 include cellular phones, tablets, and personal computers, each including at least a WPAN transceiver. Electronic device 23 is communicatively coupled to web service 112 either via access point 104 or directly via cellular communications. After paring, electronic device 23 transmits the serial number or other unique identification information of water sensor 10 to web service 112 and web service 112 provides to electronic device 23 web service access information which electronic device 23 communicates to the water sensor. The web service access information may comprise, for example, a universal resource locator (URL) and access codes with which the water sensor may transmit and receive information through access point 104. Thereafter, the water sensor can communicate with web service 112 through access point 104 independently of electronic device 23. In some embodiments, GUI 106 presents an image 136 to show the name of the network connection point to which the water sensor has been coupled. It should be understood that in a local environment there may be multiple access points and also multiple range extenders to which the water sensor may electronically couple, thus presentation of the network connection point may be helpful, for example to troubleshoot the connection if the wireless connection is unreliable or difficult to establish.

Advantageously, the user may place a water sensor in a location where WLAN reception is strong. The WLAN processor of the water detector can detect a WLAN signal from access point 104. Upon or during pairing, the water sensor communicates a WLAN signal strength to electronic device 23. If desired, the user can then move the water sensor to a location with improved signal strength so that the water sensor can more reliably communicate with access point 104. Once water sensors 10a and 10b receive the web service access information and establish communication with access point 104, they are able to communicate status updates at regular intervals or alarm signals as needed. In turn, web service 112 receives the status and alarm signals and determines whether a message is to be transmitted to selected users based on a database configured in cooperation with the administrator of environment 102. For example, the database may indicate that certain family members receive certain messages but not others, or whether a message is to be sent. Electronic device 23 may be the same or different than electronic device 120.

Figure 16:
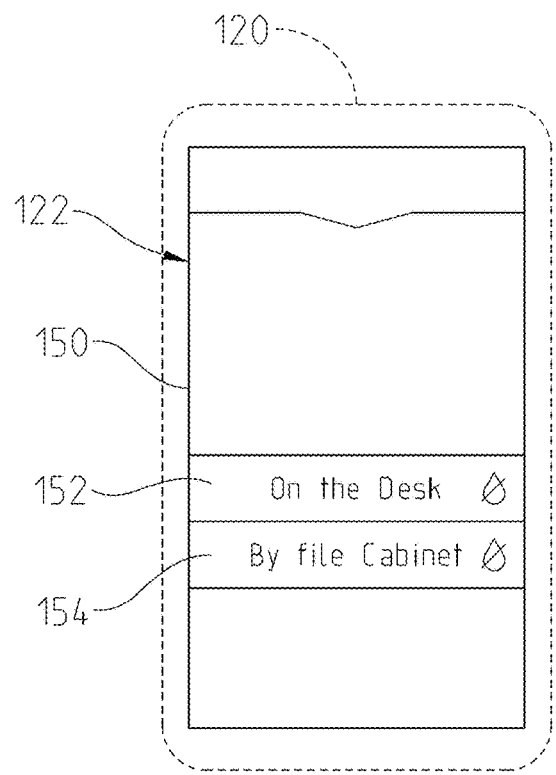
Figure 17:
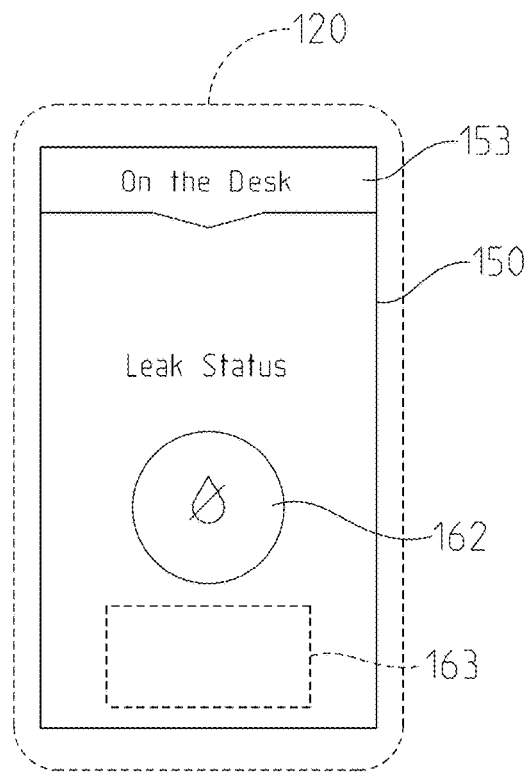

FIG. 16 illustrates a page presented by GUI 122 on a screen 150 of electronic device 120. Page 150 presents images 152, 154, showing the names of two water sensors named "On the Desk" and "By file Cabinet". The images include icons to indicate that no leaks have been detected. The user may touch over one of images 152, 154 to view a status thereof, as shown on FIG. 17, where an image 153 identifies the selected water sensor, an image 162 shows that a leak has not been detected (e.g. a drop with a line through it), and a text box 163 may present additional information, for example the time and date of the last status transmission of the water sensor. Text box 163 may also indicate the temperature and battery voltage of the water sensor.

Figure 18:
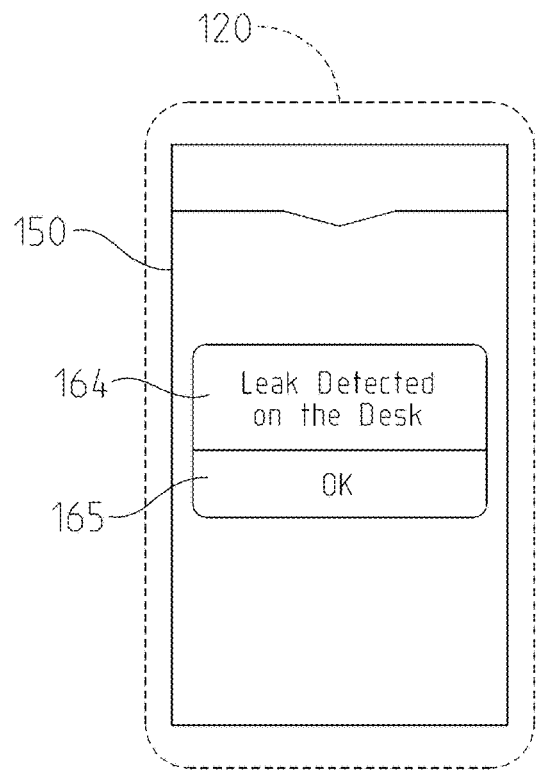
Figure 19:
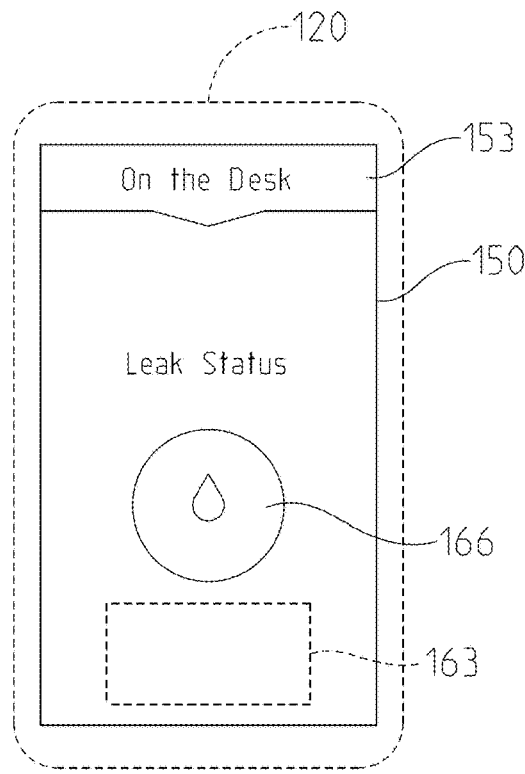

If a water sensor detects a leak, it communicates the water detection signal to web service 112, and web service 112 transmits an alert to electronic device 120. FIG. 18 shows an alert window 164 presented by GUI 122 responsive to a water detection signal and alarm. The user can acknowledge receipt of the alarm by touching screen 150 over an image 165. Thereafter GUI 122 presents, as shown on FIG. 19, an image 166 to show that water has been detected (e.g. a drop without a line through it). Image 166 may be color-coded to indicate whether the user has or has not acknowledged the alarm. Web service 112 may periodically transmit the alarm signal until it is acknowledged. The alarm signal may be transmitted to any number of electronic devices registered in a database of web service 112, and may be color-coded as acknowledged upon receipt of the first acknowledgment on any one of said electronic devices.

Figure 20:
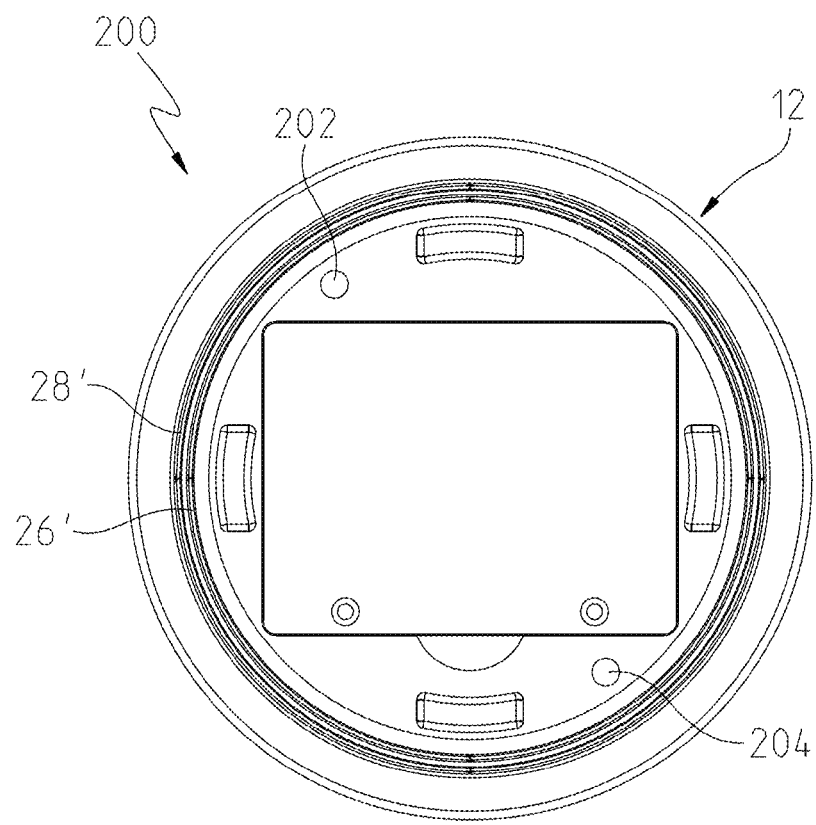
FIGS. 20 and 21 are bottom elevation and plan views of another embodiment of a water sensor.
Figure 21:
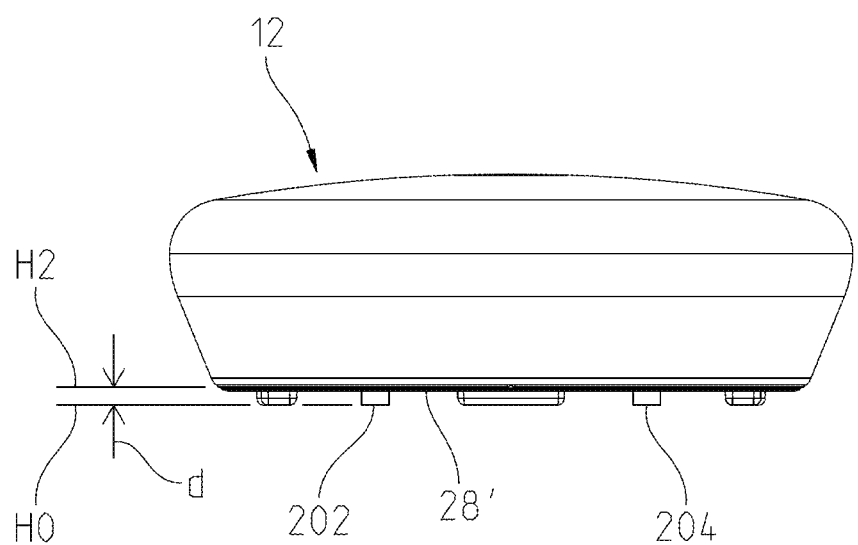
Figure 22:
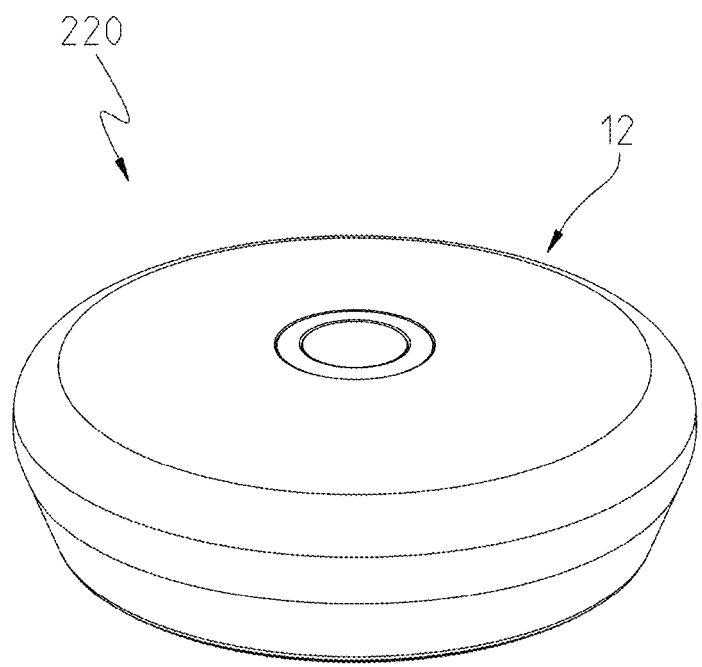
FIGS. 22 to 24 are top and bottom perspective, and bottom elevation views of a further embodiment of a water sensor.
Figure 23:
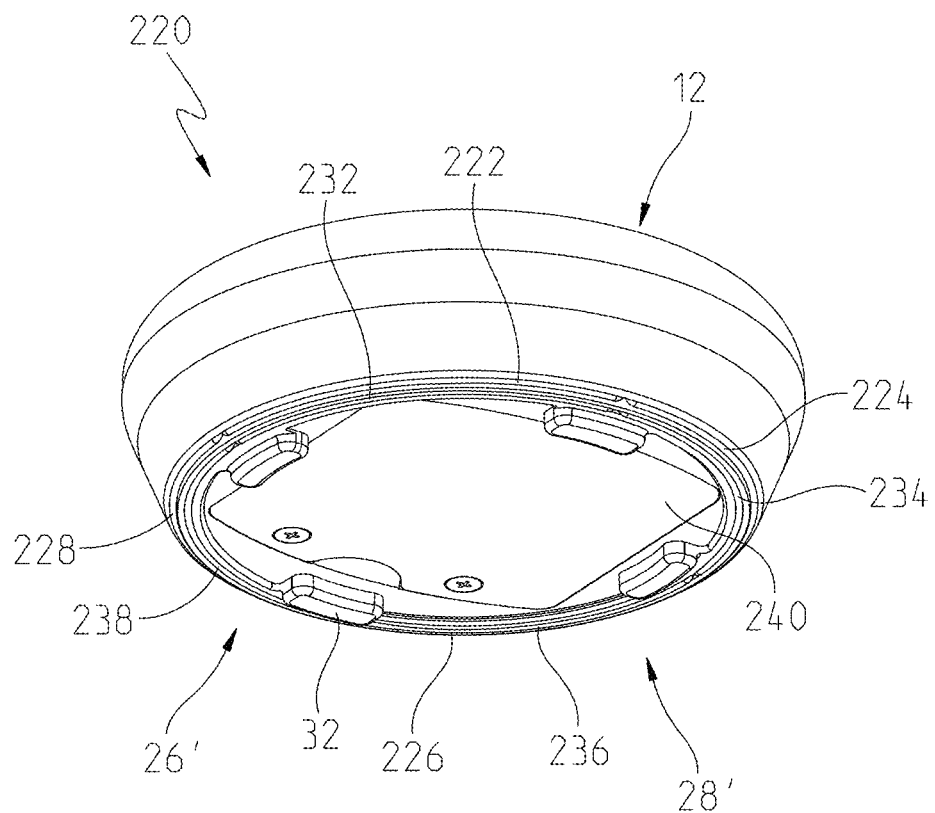
Figure 24:
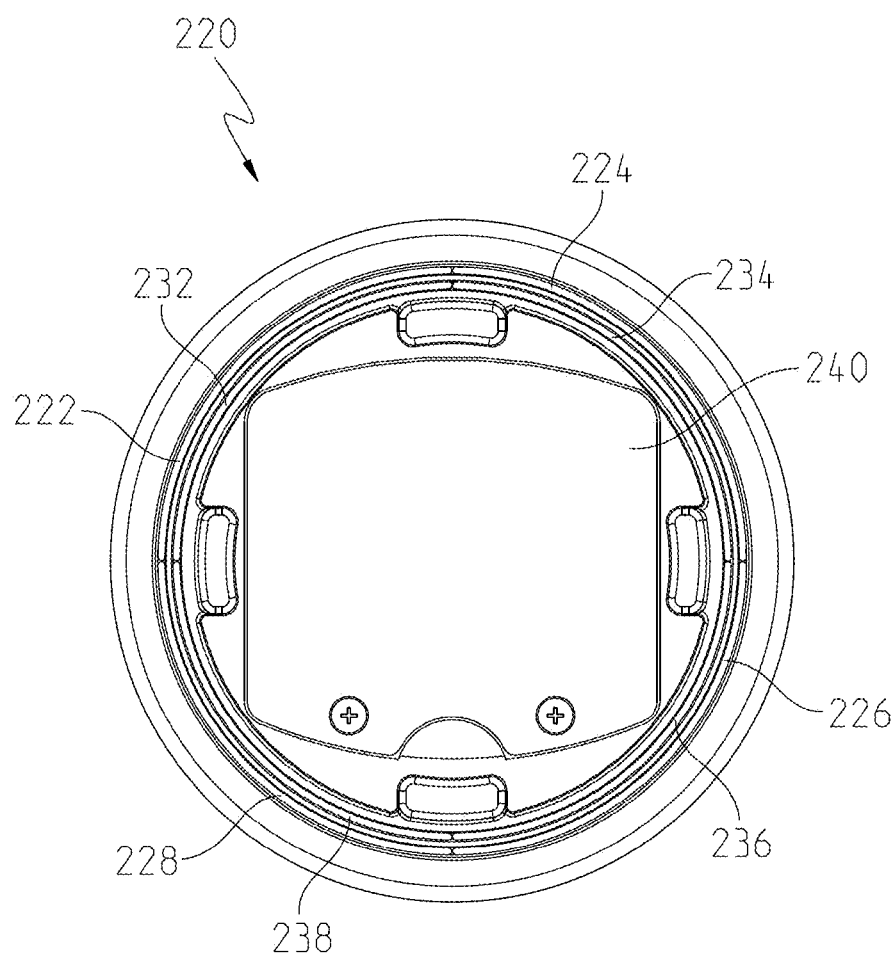

FIGS. 20 and 21 are elevation and plan views, respectively, of another embodiment of a water sensor, denoted by numeral 200. Water sensor 200 is identical in most respects to water sensor 10 and, additionally, includes electrically conductive elements 202 and 204 extending perpendicularly from the bottom surface of housing 12 below a plane H2 defined by the bottom surface of water sensor 200. A plane H0 represents the support surface upon which water sensor 200 rests. The distance "d" between planes H0, H2 is indicative of the amount of water that would have to fill the space below water sensor 200 to cause water sensor 200 to detect a flood or leak with continuity sensor 24. Instead, water sensor 200 may detect a flood or leak sooner with conductive elements 202 and 204. Conductive elements 202 and 204 are electrically coupled to a second detection circuit analogous to the first detection circuit described with reference to continuity sensor 24. Controller 20 comprises control logic structured to detect water at a first stage, responsive to a state transition of the first detection circuit, and at a second stage, responsive to a state transition of the second detection circuit.

In some embodiments, conductive elements 26, 28 are substituted by conductive elements 26', 28'. FIGS. 22 to 29 illustrate another embodiment of a water sensor, denoted by numeral 220. Water sensor 220 is identical in most respects to water sensor 200, except that conductive elements 202 and 204 have been removed. Conductive elements 26', 28' are shown, each comprising four arcuate segments, with two leg portions extending from each arcuate segment. Conductive element 26' comprises segments 232, 234, 236, and 238 (best shown in FIG. 25), and conductive element 28' comprises segments 222, 224, 226, and 228. The leg portions extend from the arcuate segments into water sensor 220 to couple with continuity sensor 24. Assembly of conductive element loops from arcuate segments may facilitate assembly of water sensor 220.

In a variation of the present embodiment, the arcuate segments do not contact each other, thus presenting small gaps between the arcuate segments, which enable the control logic in controller 20 to detect connections between any one of the eight arcuate segments and thereby determine an orientation of the water connection relative to the center of the water sensor. More or less arcuate segments may be provided to form each of the conductive element loops. The spacing between the conductive element loops may also be adjusted to define a detection sensitivity of the continuity sensor.

Figure 25:
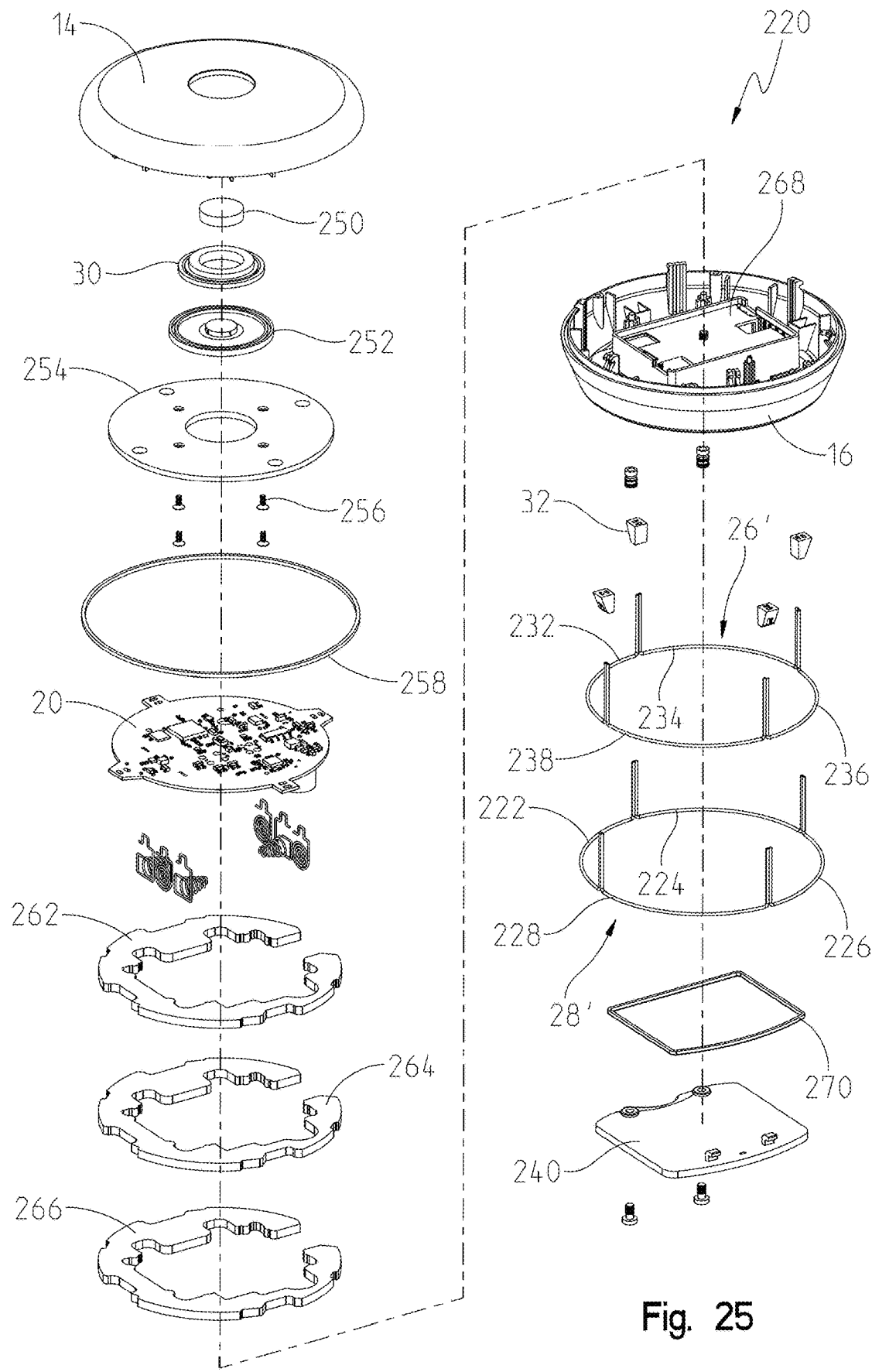
FIGS. 25 and 26 are top and bottom exploded perspective views of the water sensor of FIGS. 22 to 24.
Figure 26:
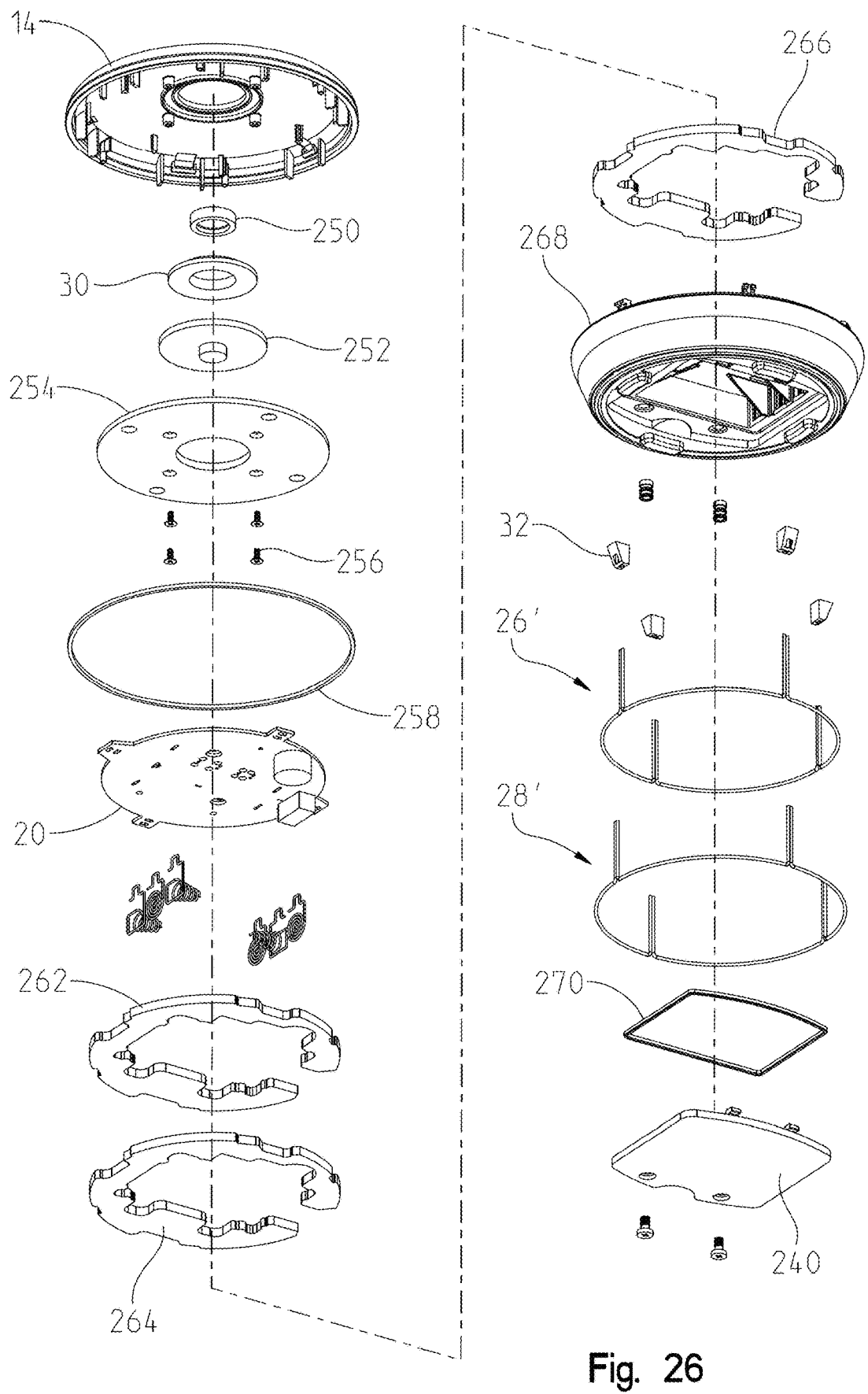

Referring to FIGS. 25 and 26, water sensor 220 comprises an actuation mechanism comprising components 250, 252, and 254, which are assemble with screws 256 to secure component 254 to top portion 14 with components 250, and 252 therebetween.

Component 252 comprises an elastic membrane and is configured to activate switch 40 when component 250 is depressed by the user. A seal 258 is disposed between top portion 14 and bottom portion 16 to form a water tight seal therebetween. A plurality of spacers 262, 264, and 266 support controller 20. A power supply housing 268 is formed on bottom portion 16. Supports 32 extend from the bottom surface of bottom portion 16. A gasket 270 is interposed between bottom portion 16 and a power supply cover 240.

Figure 27:
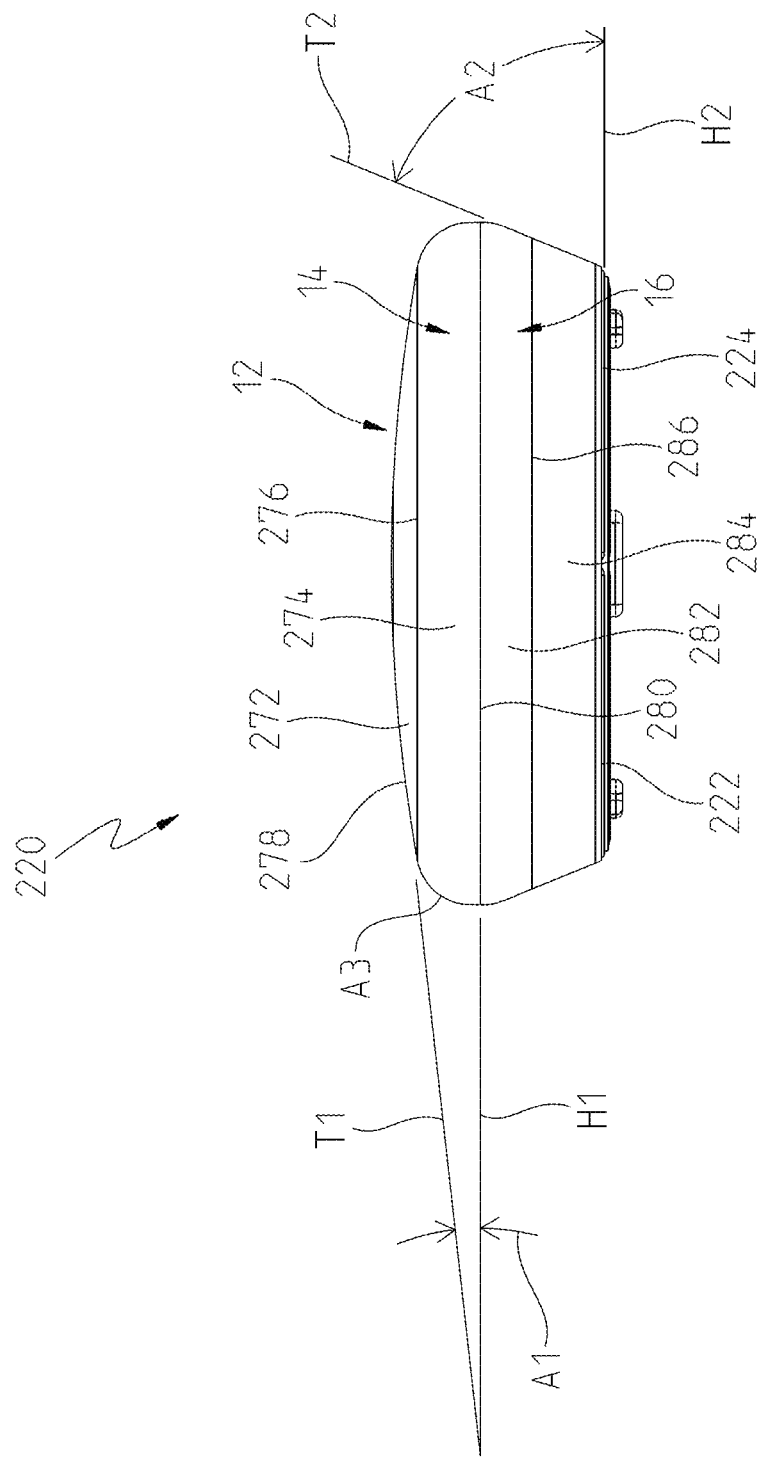
FIG. 27 is a plan view of the water sensor of FIGS. 22 to 26.
Figure 28:
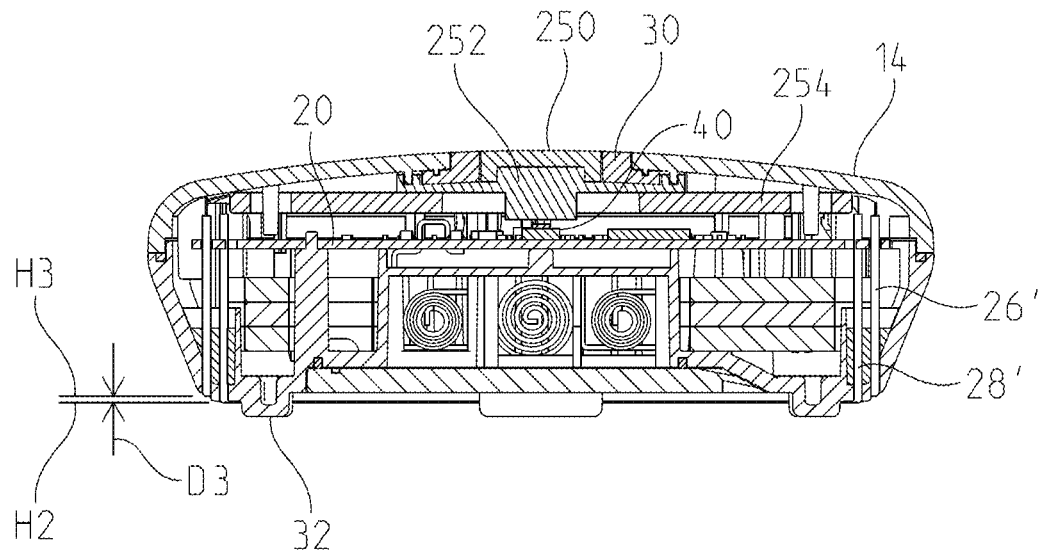
FIG. 28 is a first cross-sectional plan view of the water sensor of FIGS. 22 to 27.
Figure 29:
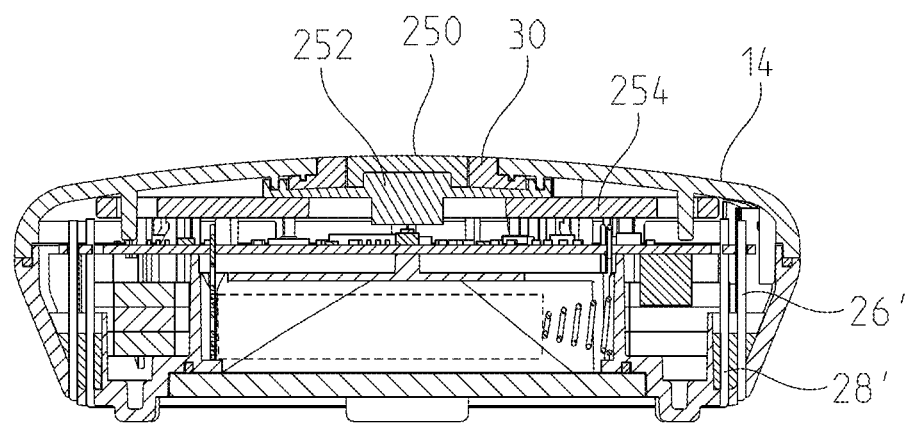
FIG. 29 is a second cross-sectional plan view of the water sensor of FIGS. 22 to 27, rotated 90 degrees from the view of FIG. 28.

The water sensors described herein, including water sensors 10, 200, 220, and variations thereof, may be sized and configured to enable water droplets to follow the contour of the water sensor housing and reach the conductive elements. Referring to FIG. 27, top portion 14 comprises an upper portion 272 having a periphery 276 and a frustoconical surface 278 extending from periphery 276. Top portion 14 also comprises a lower portion 274 connected to periphery 276. Frustoconical surface 278 is defined by two parallel planes cutting through an imaginary cone comprised by an infinite number of lines extending from the first plane through the second plane to an apex. The segments of the lines connecting the first and second planes define frustoconical surface 278. The lines may be straight. In the present embodiment the lines are arcuate. A line tangential to frustoconical surface 278 and extending between its peripheral edges, and comprised by a plane cutting through frustoconical surface 278 orthogonally to periphery 276, is denoted by T1. Periphery 276 is on a plane H1 parallel to planes H0 and H2. An angle A1 formed by T1 and H1 represents the curvature of frustoconical surface 278.

Lower portion 274 is radiused with a radius A3. Bottom portion 16 comprises an upper portion 282 having a periphery 286 and a lower portion 284. A sealed edge 280 is formed by top portion 14 and bottom portion 16 of housing 12. Bottom portion 16 has a frustoconical surface extending from sealed edge 280 to outer conductive element 26, 26' (best shown on FIG. 28), which is elevated relative to conductive element 28, 28' by a distance D3 (from plane H2 to a plane H3 parallel to H2 and comprising conductive element 26, 26'), to enable a droplet of water to follow the frustoconical surface at a velocity sufficiently slow to prevent separation from housing 12. The droplet of water then extends over conductive element 26, 26' to reach conductive element 28, 28' and close the water sensing circuit. In the present embodiment, the frustoconical surface of lower portion 284 has a straight profile that forms an angle A2 to the horizontal plane H2. Angle A2 may comprise angles in a range of about 55-80 degrees, more preferably in a range of about 60-75 degrees, and even more preferably in a range of about 65-70 degrees.

In some embodiments, radius A3 is between about 5 and 15 millimeters, is more preferably in a range of about 6-10 millimeters, and is even more preferably in a range of about 7-9 millimeters.

In some embodiments, angle A1 comprises angles in a range of about 2-15 degrees, more preferably in a range of about 3-10 degrees, and even more preferably in a range of about 5-8 degrees.

In one embodiment, angle A1 is between about 5-8 degrees, and angle A2 is between about 65-70 degrees. In one variation thereof, radius A3 is between about 6-10 millimeters.

Figure 30:
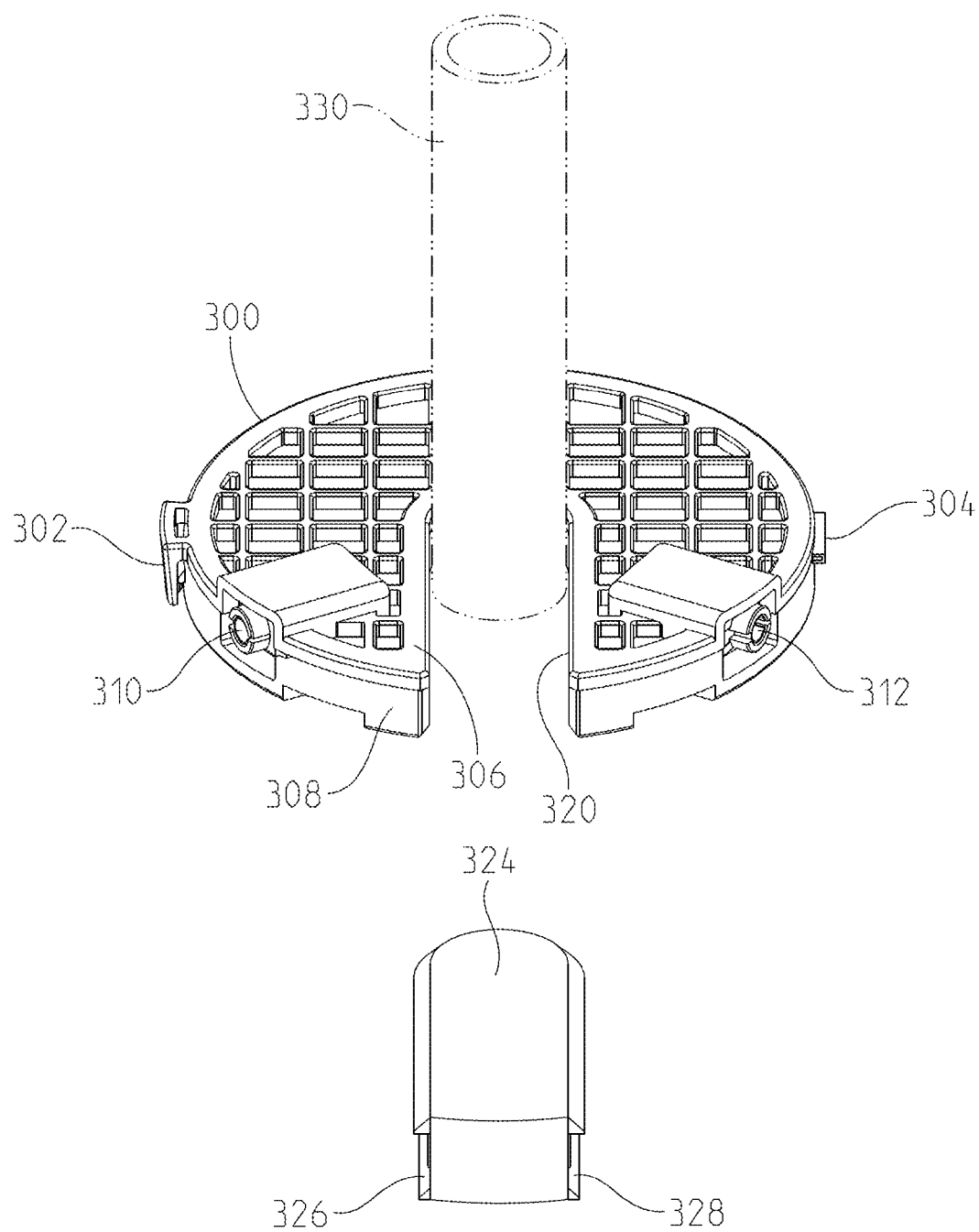
FIGS. 30 and 31 are perspective views of yet another embodiment of a water sensor.
Figure 31:
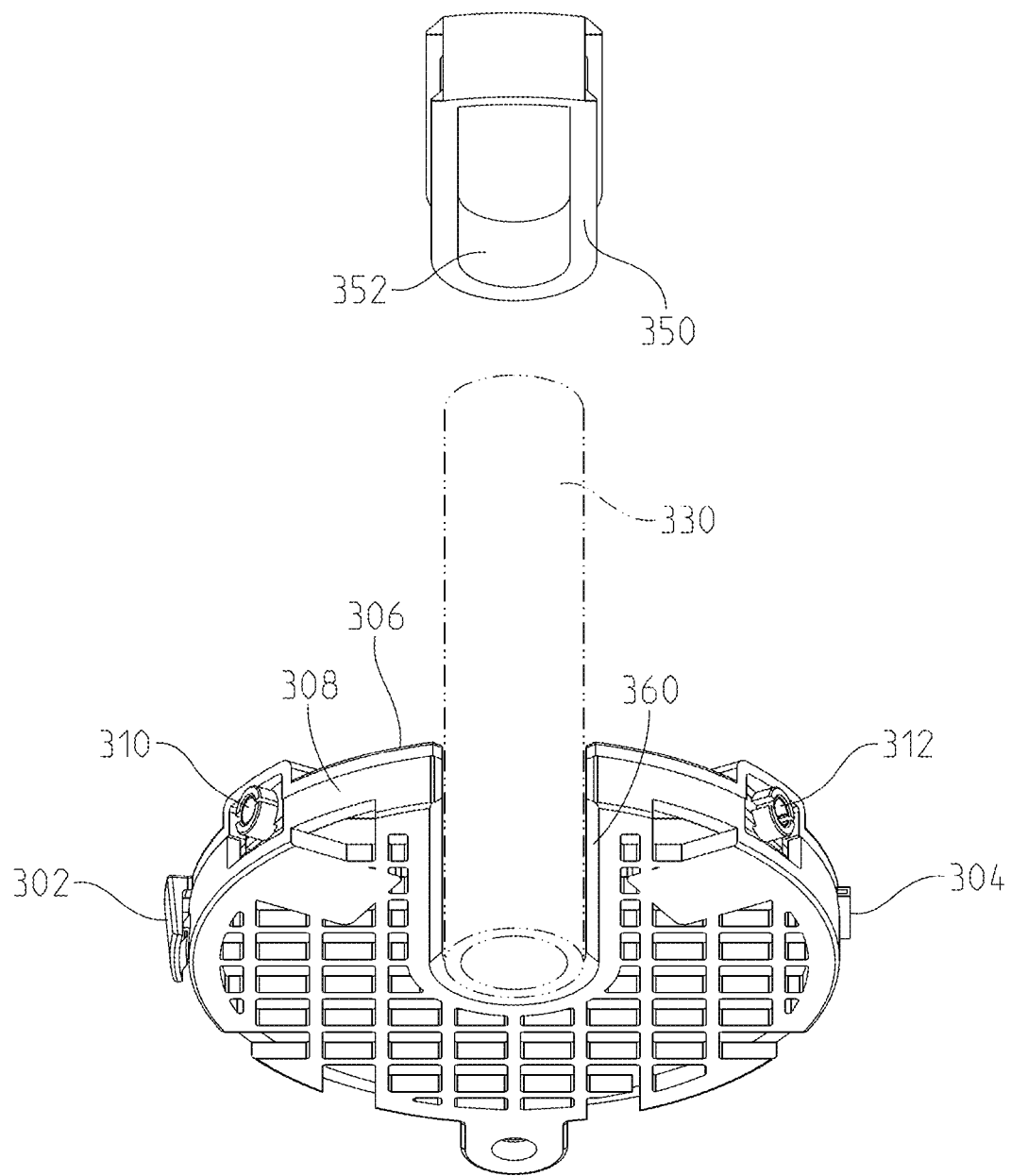

While water sensors 10, 200, and 220, and variations thereof have been described with reference to a support surface, water sensors comprising controller 20 and conductive elements may also be supported by other structures, including a water pipe. Referring to FIGS. 30 and 31, shown therein is a water sensor 300, comprising a latch 302, a hinge 304 opposite latch 302, an cover 306 and a base 308 attached to cover 306 by hinge 304 and latch 302. A notch 320 extends from a periphery of water sensor 300 to its center, the width of notch 320 configured to match a pipe diameter. A plug 324 is also shown including slots 326, 328 configured to receive opposing walls of water sensor 300 defined by notch 320. After water sensor 300 is positioned around a pipe 330, plug 324 is inserted into notch 320 to retain water sensor 300 in place. Between cover 306 and base 308 is positioned a water absorbent material. Cover 306 comprises apertures on its surface that permit water to pass therethrough to be absorbed by the absorbent material. A pair of conductive elements contact the absorbent material. When a sufficient amount of water is absorbed, the absorbent material wicks the water to an area adjacent the conductive elements, at which time the water sensing circuit is closed through the absorbent material. The sensitivity of the water sensor can be defined by the distances between the conductive elements, the absorbency of the absorbent material, and the proximity of the conductive elements to the closest aperture. In one example, controller 20 is positioned between cover 306 and base 308. In another example, a pair of connectors 310, 312 are provided to connect water sensor 300 to a controller 20 that is not positioned between cover 306 and base 308.

FIG. 31 shows a variation of the embodiment of water sensor 300 in which an elongate semi-circular element 360 extends from base 308 and is sized and configured to match the diameter of pipe 330 to provide additional support.

Figure 33:
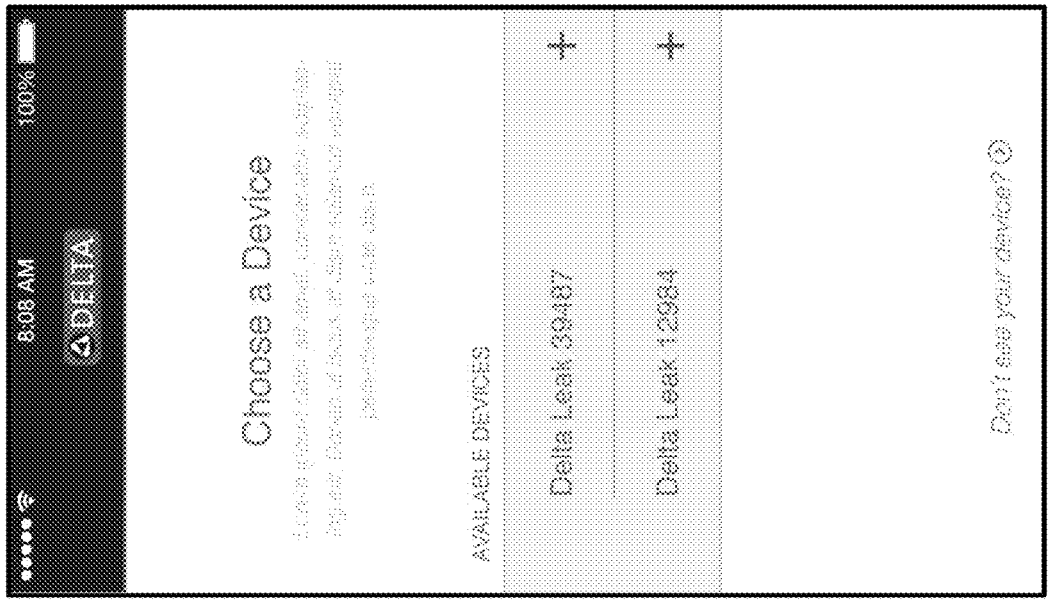
FIGS. 32 to 47 are screenshots of another embodiment of a graphical user interface operable with a water sensor.
Figure 32:
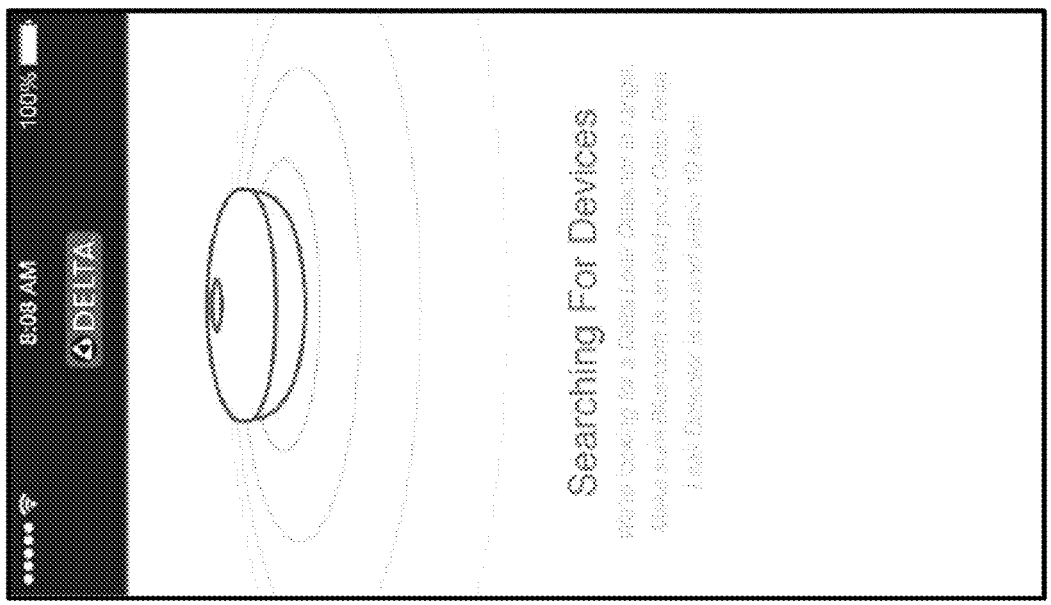
Figure 35:
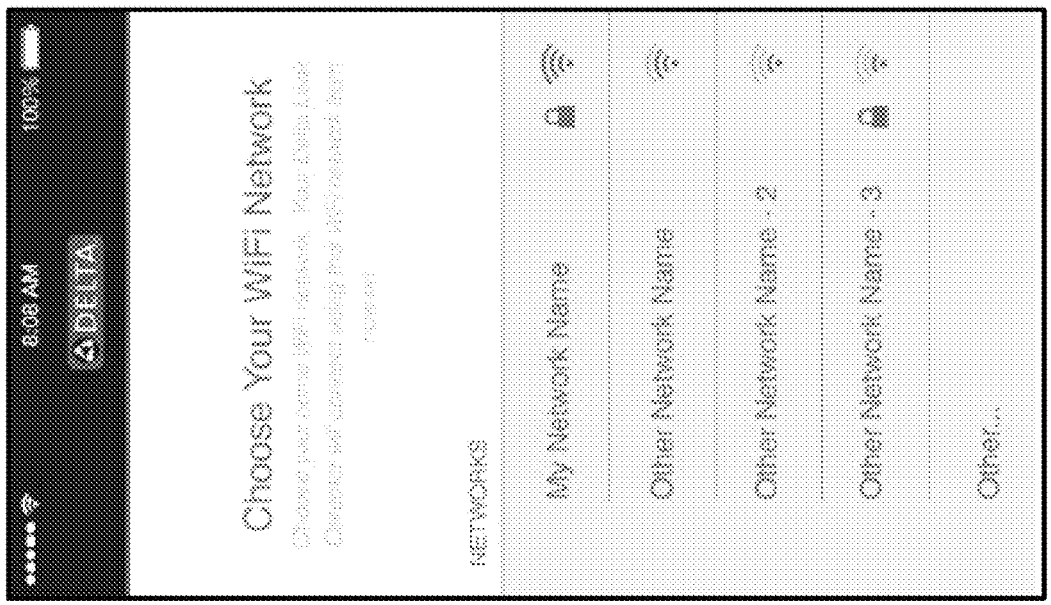
Figure 34:
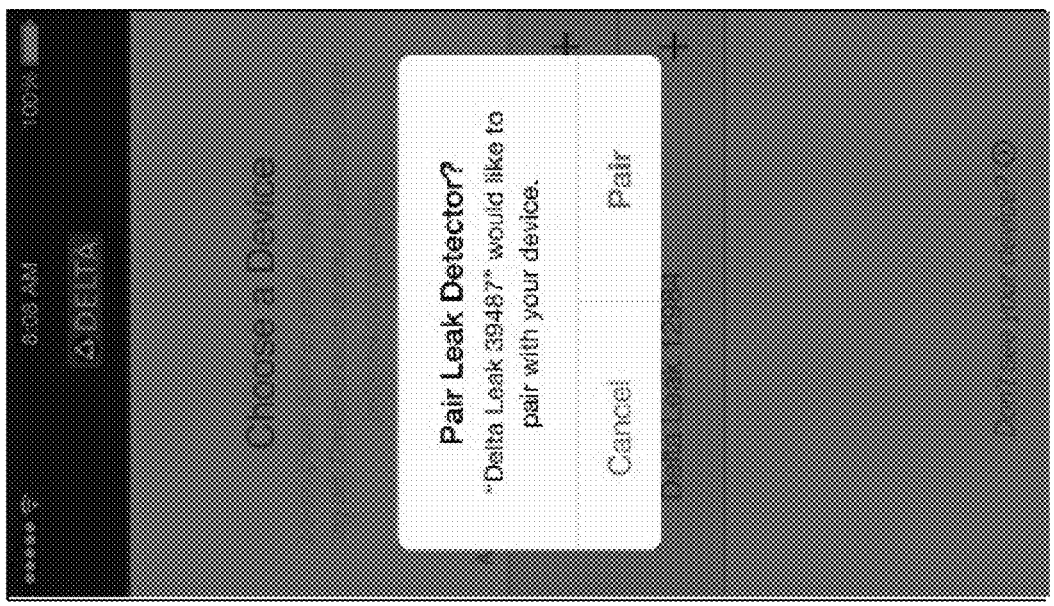

FIGS. 32 to 47 are screenshots of another embodiment of a graphical user interface operable with a water sensor. The screenshot shown in FIG. 32 illustrates an image presented by the GUI with text indicating that the electronic device is searching for devices. The screenshot shown in FIG. 33 illustrates that two water sensors were found, respectively named "Delta Leak 39487" and "Delta Leak 12984". A user may touch the screen of the electronic device above either name to pair the respective water sensor with the electronic device. The screenshot shown in FIG. 34 presents a confirmation window with which the user can confirm said pairing and FIG. 35 presents a user the opportunity to choose a Wi-Fi network for the water sensor.

Figure 37:
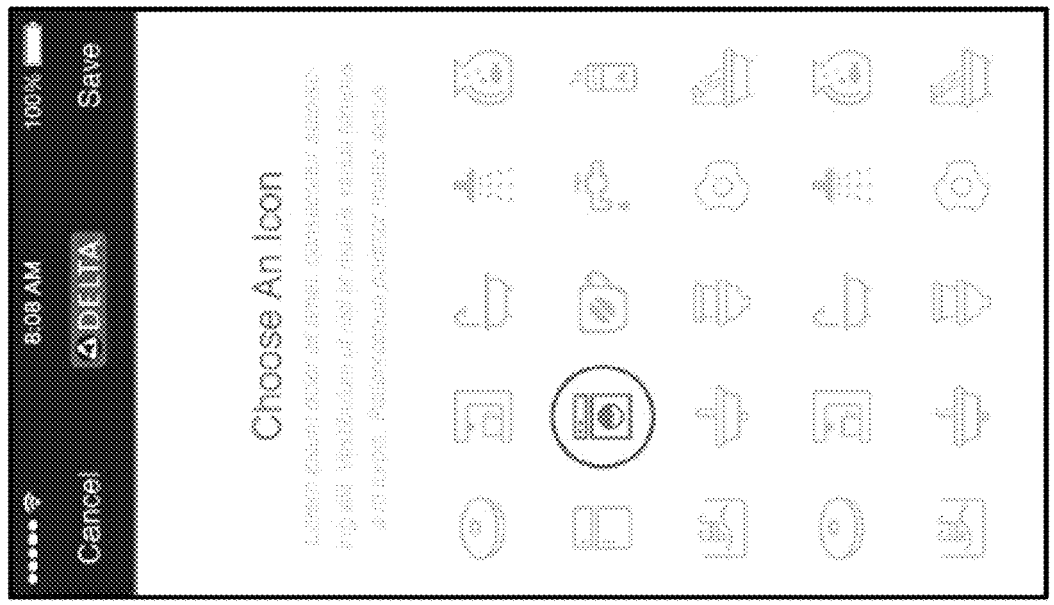
Figure 36:
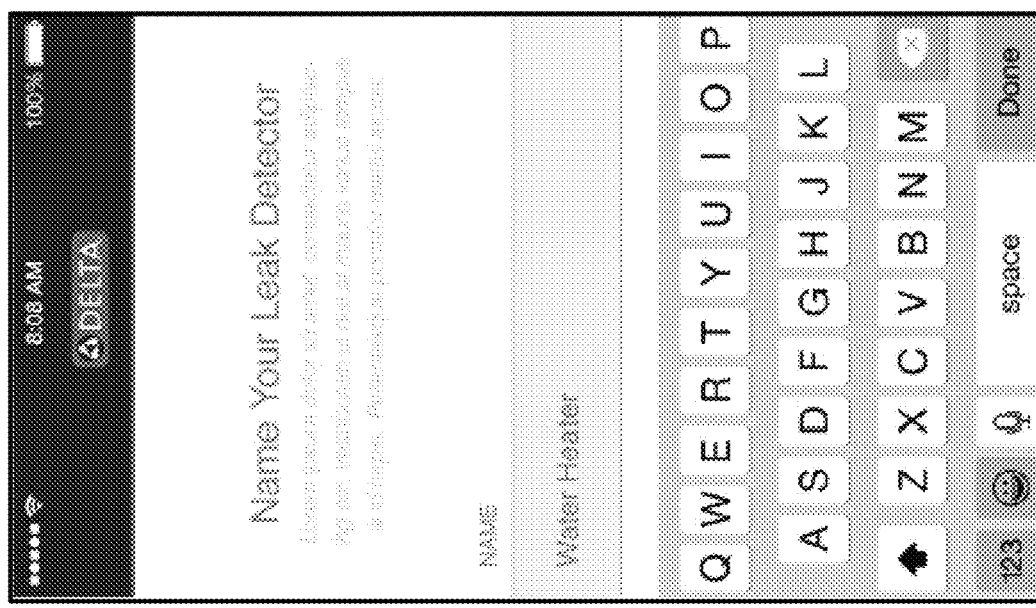
Figure 39:
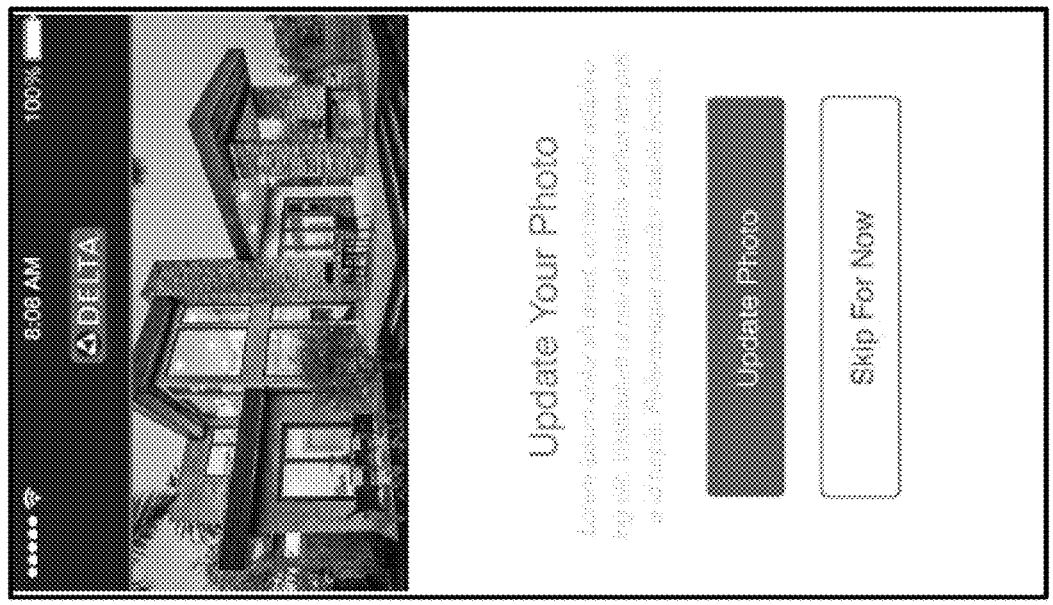
Figure 38:
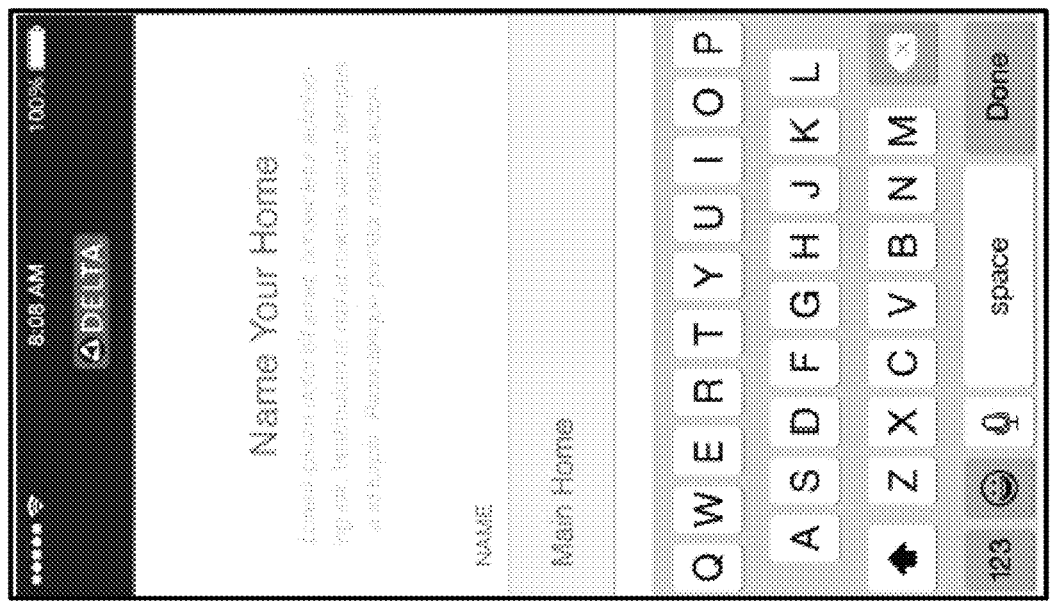

The screenshot shown in FIG. 36 provides a data field with which the user can rename a water sensor and FIG. 37 illustrates a plurality of icons corresponding to the location/use case in which the water sensor will be used. The user can select an icon to associate it with the water sensor. A laundry washer icon has been selected. The screenshot shown in FIG. 38 provides a data field with which the user can name a local environment. Example local environments include a home and a beach house. The user can define multiple local environments and place multiple water sensors in each defined local environment. The user can also associate a picture of a local environment with its name, as shown in FIG. 39.

Figure 40:
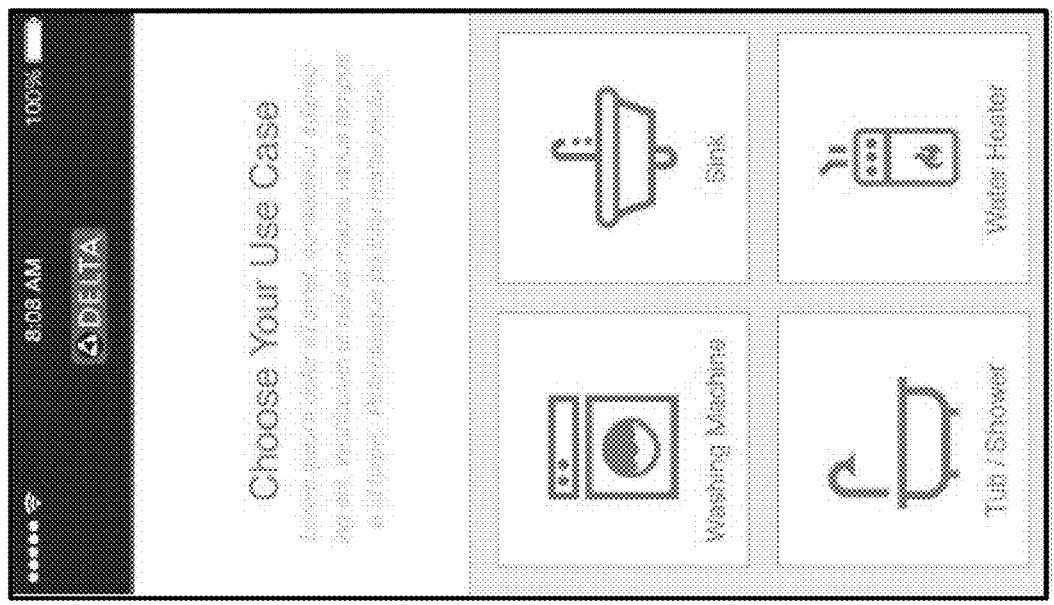
Figure 43:
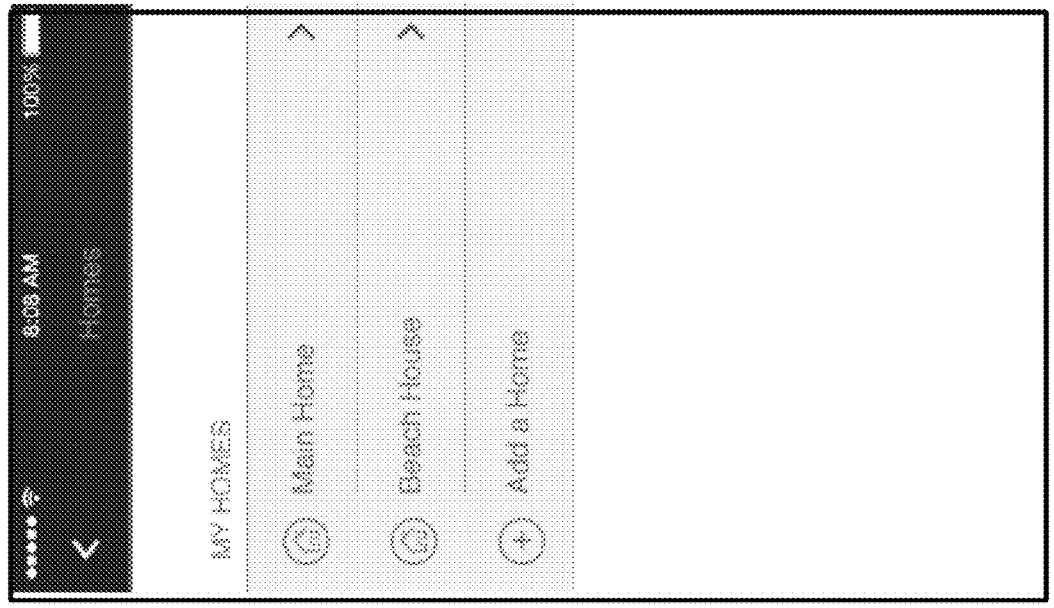
Figure 42:
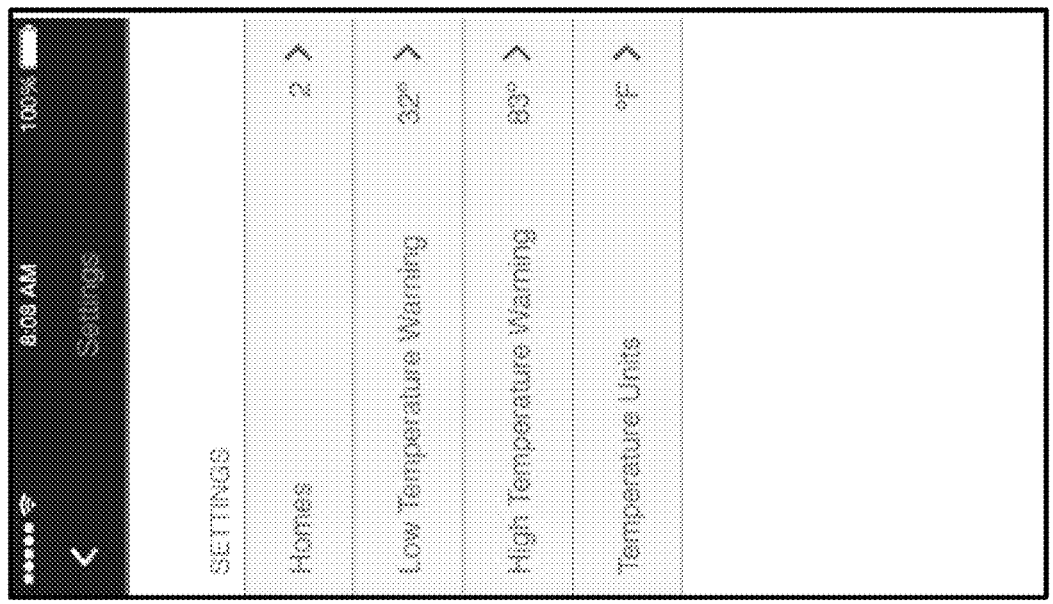
Figure 45:
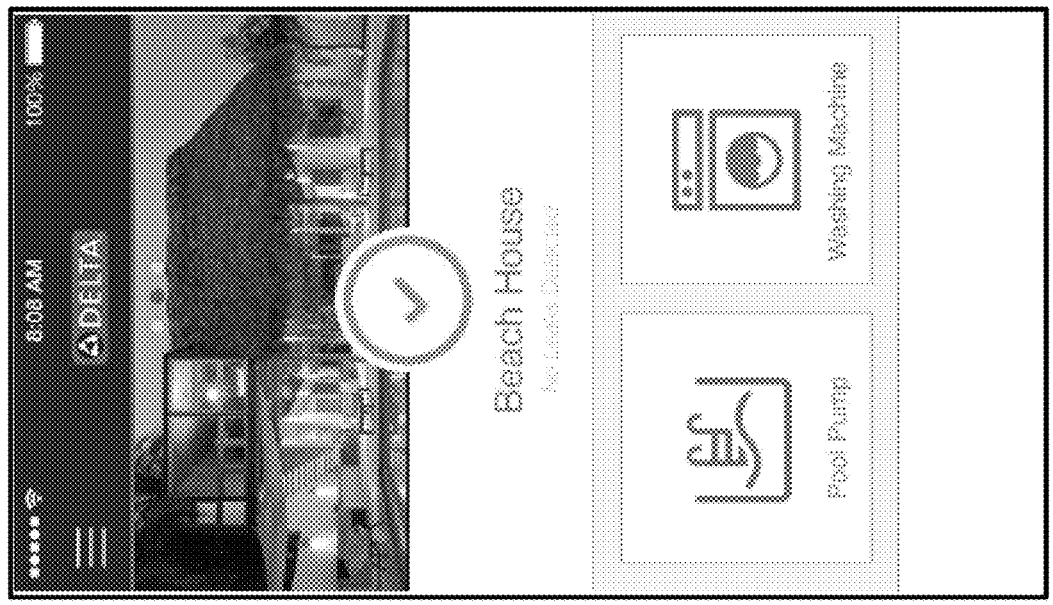
Figure 44:
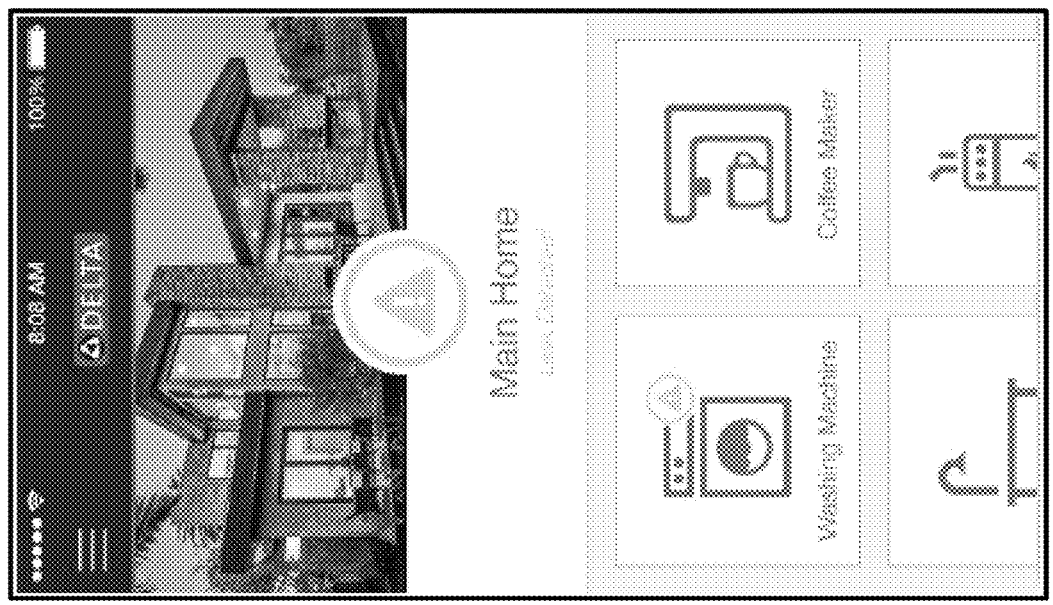
Figure 47:
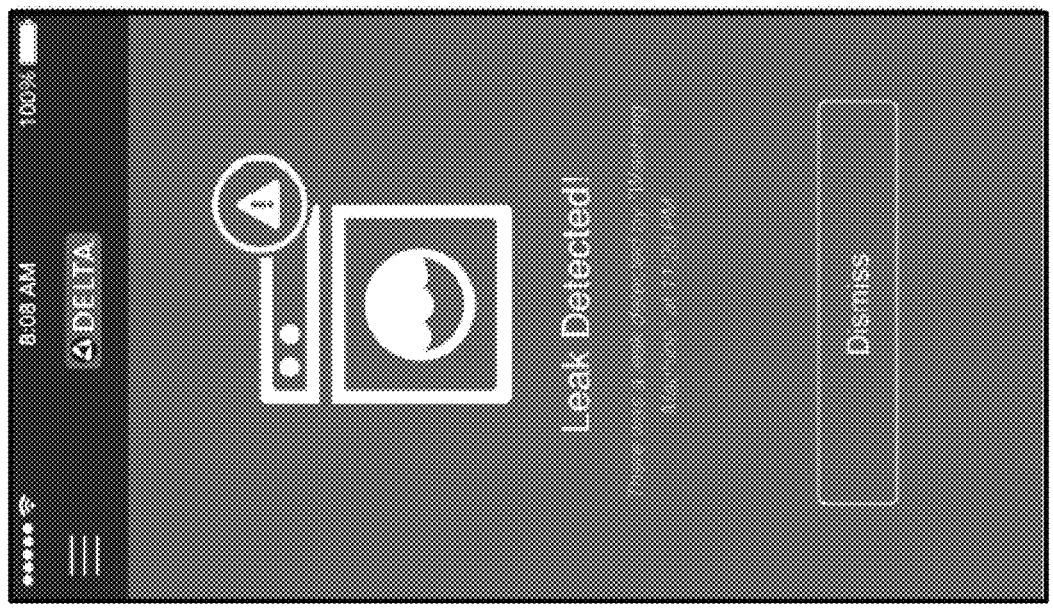

The user can also associate a use case icon with a defined local environment, as shown in FIG. 40. The user may then associate a water sensor with a selected use icon of the defined local environment. In one example, the user can check the Wi-Fi signal strength of a water sensor, as shown in FIG. 41 (80%) to assist in placement of the water sensor to achieve the a strong WLAN connection. As shown in FIG. 42, the user may also program the low and high temperature thresholds of water sensors, thus use the water sensors to detect when the heating/ventilation and air conditioning system has failed, for example. FIG. 43 illustrates a plurality of images with which the user can select a local environment and then visualize the status of the water sensors therein, as shown in FIGS. 44 and 45. FIG. 44 illustrates that a leak has been detected by the water sensor proximal to the washing machine (a warning sign is shown over the image of the main home and also over the image of the water machine, denoting a leak), and FIG. 45 illustrates that no leaks were detected in the beach house (a checkmark is shown over the image of the beach house denoting no leaks).

Figure 46:
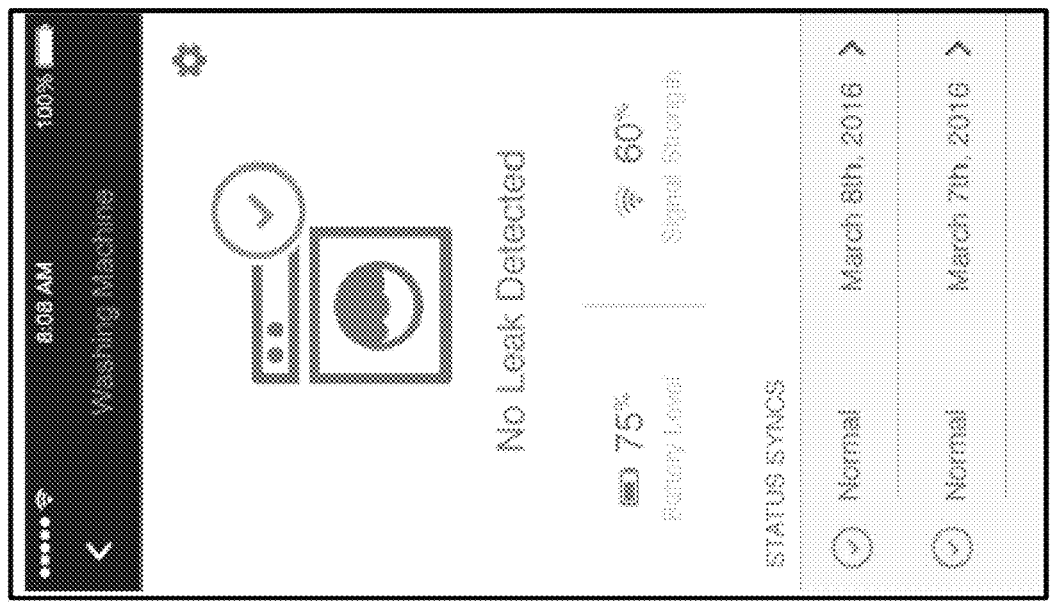

The user can navigate to a screen associated with a use case icon to view status information including battery level, signal strength, and the dates of the preceding status updates. Said screen is illustrated in FIG. 46 with reference to a washing machine. Alternatively, if a leak is detected, an image of the icon with a warning sign is shown, and also shown is an object labelled "dismiss" with the user can activate to acknowledge the leak and the respective alarm.

The foregoing screenshots exemplify a method of associating water sensors with local environments, programming of the water sensors, and water detection alarms. The screenshots are generated with electronic device applications in ways that are well known in the art. Example electronic devices may comprise operating systems such as the Apple iOS operating system and Google's Android operating system.

Some examples of embodiments described above and variations thereof are summarized below:

Example 1—A water sensor comprising: a housing including a top portion and a bottom portion; a controller positioned within the housing; a power source positioned within the housing and in electrical communication with the controller; and a continuity sensor coupled to the bottom portion of the housing and in electrical communication with the controller, the continuity sensor including an electrically conductive inner loop and an electrically conductive outer loop surrounding the inner loop, wherein water between the inner loop and the outer loop electrically couples the inner loop and the outer loop to provide an electrical circuit which is detected by the controller.

The water sensory device of example 1, further comprising an actuating mechanism supported by the top portion of the housing and in electrical communication with the controller.

The water sensor of claim 1, wherein the actuating mechanism is a button.

The water sensor of example 1, further comprising a plurality of supports spaced about the bottom surface of the bottom cover and supporting the sensor above a supporting ground surface.

The water sensor of example 1, wherein the top portion of the housing is convex to direct water from the top portion to the bottom portion.

The water sensor of example 1, wherein a bottom surface of the bottom cover is approximately 2.5 millimeters from a lateral surface.

The water sensor of example 1 further comprising a visual indicator surrounding the actuating mechanism. A variation of the present example, wherein the visual indicator is an LED light.

The water sensor of example 1, wherein the power source comprises a battery.

The water sensor of example 1, further comprising an audible indicator within the housing.

The water sensor of example 1, further comprising a wireless transmitter in electrical communication with the controller and configured to communicate an alert signal to a wireless network when water is detected between the inner loop and the outer loop. A variation of the present example, further comprising a remote electronic device in communication with the wireless network.

The water sensor of example 1, further comprising first and second downwardly extending electrically conductive protrusions.

Example 2—A water sensor comprising: a housing including a top surface and a bottom surface; a controller positioned within the housing; a power source positioned within the housing and in electrical communication with the controller; an actuating mechanism supported by the top surface of the housing and configured to be in communication with the controller; a sensor coupled to the bottom surface of the housing configured to measure an electrical property between at least two conductive elements and to determine a presence of water from the measured electrical property; and a low-power wireless connection configured to communicate information from the water sensor to an electronic device.

The water sensor of example 2, wherein the top surface is convex to allow water to be directed from the top surface to the bottom surface.

The water sensor of example 2, wherein the at least two conductive elements extend substantially circumferentially about the bottom surface of the housing.

The water sensor of example 2, wherein the bottom surface of the housing is approximately 2.5 millimeters from a surface.

The water sensor of example 2, wherein at least one of the at least two conductive elements includes at least one upper portion and at least one lower portion, wherein the lower portion supports the water sensor above a surface.

The water sensor of example 2, wherein the electronic device is a mobile device.

The water sensor of example 2, wherein the at least two conductive elements are configured to distinguish between different quantities of water.

Example 3—A method for sensing a presence of water comprising the steps of: providing at least one water sensor including a housing with a top surface and a bottom surface, a controller positioned within the housing, a power source positioned within the housing and in communication with the controller, and a sensor coupled to the bottom surface of the housing including at least two conductive elements configured to measure an electrical property between the conductive elements and to determine a presence of water from the measured electrical property in a detection zone, wherein each of the conductive elements spacedly extends substantially circumferentially about the bottom surface of the housing; activating the water sensor; coupling the water sensor to an electronic device via a wireless connection; and transmitting information between the water sensor and the electronic device.

The method of example 3, further comprising a button disposed about the top surface of the housing and capable of communicating with the controller.

The method of example 3, wherein the step of coupling the water sensor to the electronic device includes the step of pushing the button of the water sensor.

The method of example 3, further comprising the step of pushing the button of the water sensor such that the water sensor transmits a signal strength reading to the electronic device.

The method of example 3, wherein the wireless connection is a low-power wireless connection.

The method of example 3, wherein the step of coupling the water sensor to the electronic device via a wireless connection includes the steps of: downloading an application to the electronic device; adding the water sensor to the application; and transmitting information between the water sensor and the electronic device.

The method of example 3, wherein the information transmitted between the water sensor and the electronic device includes at least one of a signal strength, a detection signal and a status signal.

Example 4—A water sensor comprising: a housing including a top portion and a bottom portion; a controller positioned within the housing; a power source positioned within the housing and in electrical communication with the controller; a first continuity sensor coupled to the bottom portion of the housing and in electrical communication with the controller; and a second continuity sensor coupled to the bottom portion of the housing and in electrical communication with the controller.

The water sensor of example 4, wherein the first continuity sensor includes an electrically conductive inner loop and an electrically conductive outer loop, wherein water between the inner loop and the outer loop electronically couples the inner loop and the outer loop to provide an electrical circuit which is detected by the controller. A variation of the present example, wherein the second continuity sensor includes first and second downwardly extending electrically conductive protrusions, wherein water between the first protrusion and the second protrusion electrically couples the first protrusion and second protrusion to provide an electrical circuit which is detected by the controller.

The water sensor of example 4, further comprising an actuating mechanism supported by the top portion of the housing and in electrical communication with the controller.

The water sensor of example 4, further comprising a plurality of supports spaced about the bottom surface of the bottom cover and supporting the sensor above a supporting ground surface.

The water sensor of example 4, the top portion of the housing is convex to allow water to be directed from the top portion to the bottom portion.

The water sensor of example 4, further comprising an audible indicator within the housing.

The water sensor of example 4, further comprising a wireless transmitter in electrical communication with the controller and configured to communicate an alert signal to a wireless network when water is detected between the inner loop and the outer loop.

Although the invention has been described in detail with reference to certain preferred embodiments, variations and modifications exist within the spirit and scope of the invention as described and defined in the following claims.

The invention claimed is:

1. A water sensor comprising:
a housing including a top portion and a bottom portion;
a controller positioned within the housing;
a power source positioned within the housing and electrically coupled to the controller to energize the controller; and
a sensor electrically coupled to the controller, the sensor comprising control logic coupled to the controller, wherein the control logic is structured to transition from a first logical state to a second logical state responsive to water being sensed by the sensor;
wherein the controller is configured to transition from a sleep mode to an active mode in response to the control logic transitioning from the first logical state to the second logical state;
wherein the controller is further configured to transmit a first type of signal when the control logic is in the first logical state and transmit a second type of signal when the control logic is in the second logical state, wherein the first type of signal consumes less power than the second type of signal;
a visual indicator operably coupled to the controller, wherein the visual indicator outputs a first indication in response to a successful pairing between the water sensor and an electronic device; and
wherein the visual indicator outputs a second indication in response to an unsuccessful pairing between the water sensor and the electronic device.

2. The water sensor of claim 1, wherein the controller is further configured to pair with an electronic device to form a wireless personal area network.

3. The water sensor of claim 2, further comprising an actuating mechanism, wherein the controller emits a signal to pair with the electronic device in response to engagement of the actuating mechanism.

4. The water sensor of claim 3, wherein the controller transitions from the sleep mode to the active mode in response to the engagement of the actuating mechanism when the water sensor is successfully paired with the electronic device.

5. The water sensor of claim 2, wherein the controller is configured to output a signal strength when the water sensor is being paired with the electronic device.

6. The water sensor of claim 1, further comprising a temperature sensor, wherein the controller is configured to output a temperature signal corresponding to a temperature sensed by the temperature sensor.

7. An electronic device for pairing with a water sensor, the electronic device comprising:
a transceiver;
a processor coupled to the transceiver;
a user interface coupled to the processor;
memory coupled to the processor and comprising instructions that when executed by the processor cause the processor to:
receive, via the transceiver, a leak signal from the water sensor,
wherein the leak signal corresponds to the water sensor sensing water;
display, on the user interface, an alert icon in response to receiving the leak signal;
receive, via the transceiver, a signal strength signal from the water sensor;
display, on the user interface, a signal strength icon corresponding to the signal strength signal received from the water sensor on a user interface of the electronic device;
receive, via the transceiver, a pairing signal from the water sensor;
pair the electronic device with the water sensor to form a wireless personal area network in response to receiving the pairing signal; and
display, on the user interface, an icon corresponding to the water sensor on the electronic device in response to the electronic device being paired with the water sensor;
wherein the water sensor includes a controller and control logic coupled to the controller, the control logic structured to transition from a first logical state to a second logical state responsive to water being sensed by the water sensor; and
wherein the controller is further configured to transmit a first type of signal when the control logic is in the first logical state and transmit a second type of signal when the control logic is in the second logical state, wherein the first type of signal consumes less power than the second type of signal.

8. The electronic device of claim 7, the memory comprising further instructions that when executed by the processor cause the processor to:
receive, via the user interface, an acknowledgement input from a user via the electronic device; and
transition the alert icon from a first state to a second state in response to the acknowledgement input.

9. The electronic device of claim 8, wherein the alert icon is displayed in a first color while the alert icon is in the first state and wherein the alert icon is displayed in a second color while the alert icon is in the second state, wherein the first color is different than the second color.

10. The electronic device of claim 7, the memory comprising further instructions that when executed by the processor cause the processor to:
receive, via the transceiver, a temperature signal from the water sensor; and
display, on the user interface, a temperature icon corresponding to the temperature signal received from the water senor.

11. The electronic device of claim 7, the memory comprising further instructions that when executed by the processor cause the processor to:
receive, via the transceiver, a voltage signal from the water sensor; and
display, on the user interface, a voltage icon corresponding to the voltage signal received from the water senor.

* * * * *